(12) United States Patent
Ozturk et al.

(10) Patent No.: US 11,882,597 B2
(45) Date of Patent: Jan. 23, 2024

(54) LISTEN BEFORE TALK FAILURE RECOVERY CANCELLATION

(71) Applicant: QUALCOMM Incorporated, San Diego, CA (US)

(72) Inventors: Ozcan Ozturk, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/197,698

(22) Filed: Mar. 10, 2021

(65) Prior Publication Data

US 2021/0289553 A1  Sep. 16, 2021

Related U.S. Application Data

(60) Provisional application No. 62/989,463, filed on Mar. 13, 2020.

(51) Int. Cl.
*H04W 74/08* (2009.01)
*H04W 72/04* (2023.01)
(Continued)

(52) U.S. Cl.
CPC ....... *H04W 74/0816* (2013.01); *H04W 24/08* (2013.01); *H04W 28/04* (2013.01); *H04W 72/0453* (2013.01)

(58) Field of Classification Search
CPC . H04W 74/0816; H04W 16/14; H04W 24/04; H04W 24/08; H04W 36/0072; H04W 36/0079; H04W 36/06; H04W 36/24; H04W 48/10; H04W 48/12; H04W 74/0833; H04W 74/085; H04W 76/27; H04W 72/0453; H04W 74/0808
See application file for complete search history.

(56) References Cited

U.S. PATENT DOCUMENTS

2021/0100031 A1\* 4/2021 Cirik ................. H04W 76/19
2021/0144761 A1\* 5/2021 Chin ................. H04W 36/0079
(Continued)

OTHER PUBLICATIONS

Huawei, et al., "Discussion on Handover in NR-U", 3GPP Draft, R4-2001555, 3GPP RAN WG4 Meeting #94-e, 3rd Generation Partnership Project (3GPP), Mobile Competence Centre, 650, Route Des Lucioles, F-06921 Sophia-Antipolis Cedex, France, vol. RAN WG4, No. Online, Feb. 24, 2020-Mar. 6, 2020, Feb. 14, 2020 (Feb. 14, 2020), XP051851466, 2 Pages. Retrieved from the Internet: URL: https://ftp.3gpp.org/tsg_ran/WG4_Radio/TSGR4_94_e/Docs/R4-2001555.zip. R4-2001555.docx [Retrieved on Feb. 14, 2020] pages 1-2, paragraph 2.

(Continued)

Primary Examiner — Awet Haile
(74) Attorney, Agent, or Firm — QUALCOMM Incorporated

(57) ABSTRACT

An apparatus is provided to perform listen before talk failure recovery and cancel a recovery response based on a trigger. The apparatus may monitor for a consistent listen before talk (LBT) failure for an uplink transmission to a base station, determine whether to perform a LBT recovery response based on the monitoring, detect a trigger, and cancel the LBT recovery response or resetting the monitoring based on the trigger.

30 Claims, 15 Drawing Sheets

(51) Int. Cl.
  *H04W 28/04*    (2009.01)
  *H04W 24/08*    (2009.01)
  *H04W 72/0453*  (2023.01)

(56) References Cited

U.S. PATENT DOCUMENTS

2021/0219322 A1* 7/2021 Chin ............... H04L 1/1896
2022/0022252 A1* 1/2022 Lee ................ H04W 76/18
2022/0110159 A1* 4/2022 Shi ................ H04W 74/0866

OTHER PUBLICATIONS

Huawei, et al., "Remaining Issues on LBT Failure MAC CE", 3GPP Draft, 3GPP TSG-RAN WG2 eMeeting 109, R2-2000963, 3rd Generation Partnership Project (3GPP), Mobile Competence Centre, 650, Route Des Lucioles, F-06921 Sophia-Antipolis Cedex, France, vol. RAN WG2, No. eMeeting, Feb. 24, 2020-Mar. 6, 2020, Feb. 14, 2020 (Feb. 14, 2020), XP051849398, 4 Pages, Paragraphs [0002]-[0004].

International Search Report and Written Opinion—PCT/US2021/021971—ISA/EPO—dated Jun. 29, 2021.

OPPO: "Uplink LBT Failure Recovery for NR-U", 3GPP Draft, 3GPP TSG-RAN WG2 Meeting #107bis, R2-1912096, Uplink LBT Failure Recovery for NR-U, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 3, 2019 (Oct. 3, 2019), XP051803719, 3 Pages, paragraph [0002].

QUALCOMM: "NR-Based Access to Unlicensed Spectrum", 3GPP Draft, 3GPP TSG RAN meeting #87-e, RP-200175, 3rd Generation Partnership Project (3GPP), Mobile Competence Centre, 650, Route Des Lucioles, F-06921 Sophia-Antipolis Cedex, France, vol. TSG RAN, No. Mar. 16, 2020-Mar. 19, 2020, Mar. 11, 2020 (Mar. 11, 20201), XP051865160, 28 Pages.

VIVO: "Discussion on the Recovery Procedure of the UL LBT Failure", 3GPP Draft, 3GPP TSG-RAN WG2 Meeting #106, R2-1905626, Discussion on the Recovery Procedure of the UL LBT Failure, 3rd Generation Partnership Project (3GPP), Mobile Competence Centre, 650, Route Des Lucioles, F-06921 Sophia-Antipolis, vol. RAN WG2, No. Reno, USA, May 13, 2019-May 17, 2019, May 13, 2019 (May 13, 2019), XP051729129, 3 Pages.

* cited by examiner

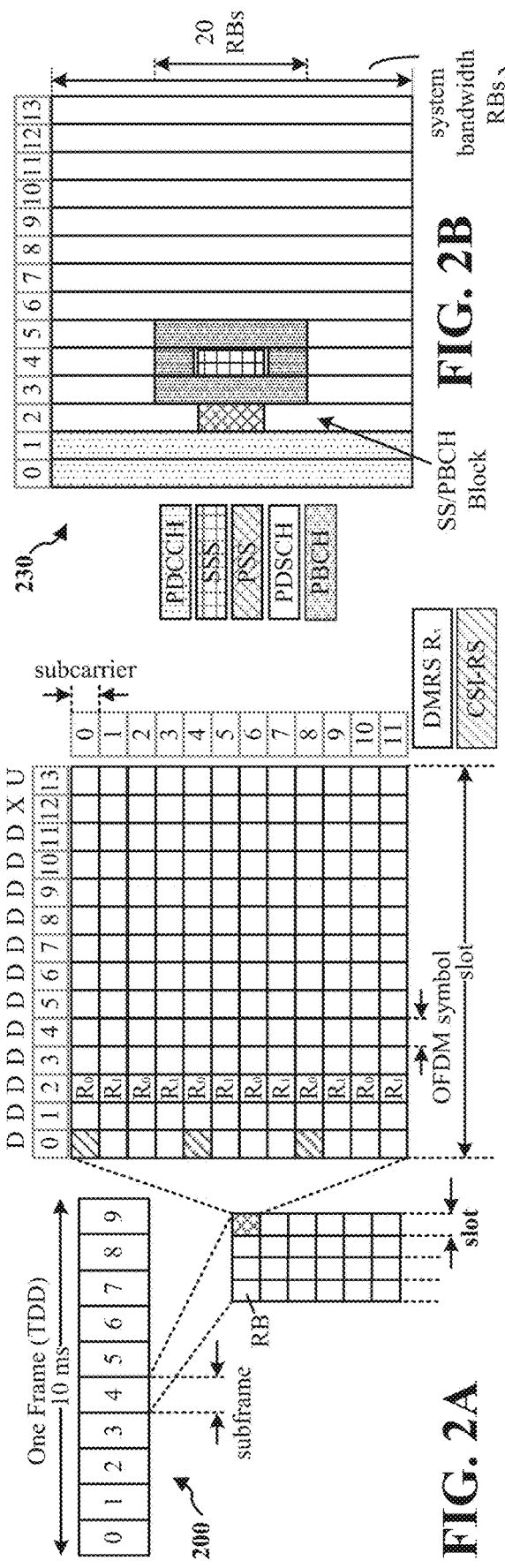
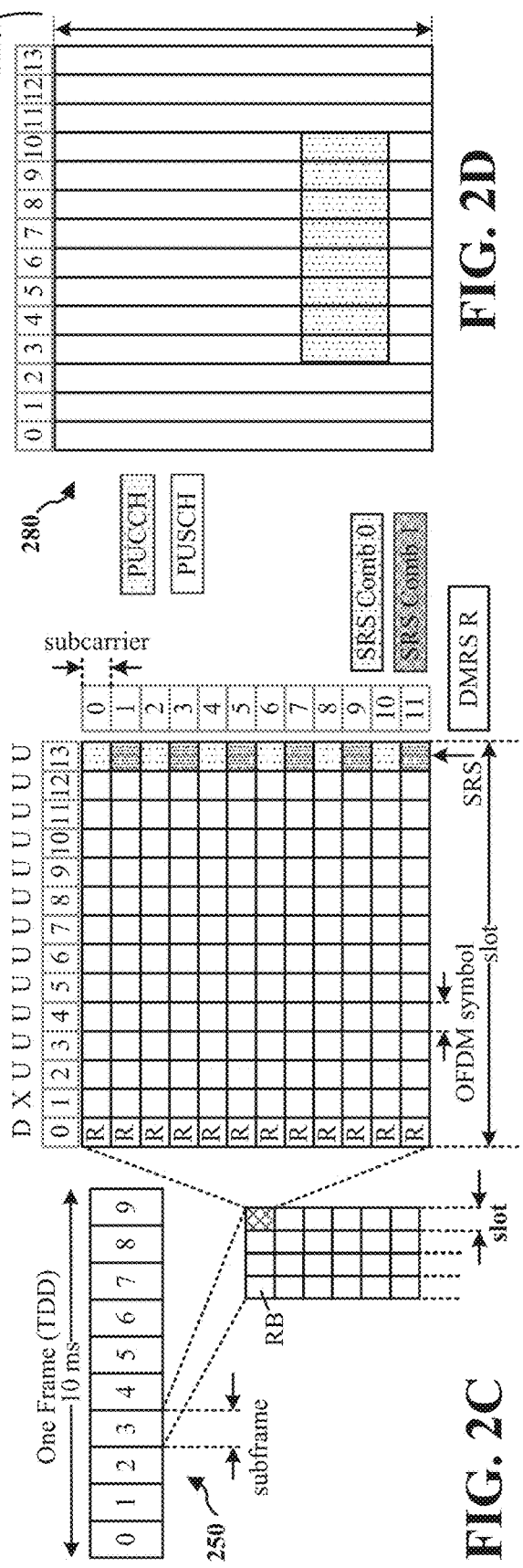
FIG. 2A
FIG. 2B
FIG. 2C
FIG. 2D

LISTEN BEFORE TALK FAILURE RECOVERY CANCELLATION

CROSS REFERENCE TO RELATED APPLICATION(S)

This application claims the benefit of U.S. Provisional Application Ser. No. 62/989,463, entitled "LISTEN BEFORE TALK FAILURE RECOVERY CANCELLATION" and filed on Mar. 13, 2020, which is expressly incorporated by reference herein in its entirety.

BACKGROUND

Technical Field

The present disclosure relates generally to communication systems, and more particularly, to a wireless communication system using listen before talk.

INTRODUCTION

Wireless communication systems are widely deployed Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may monitor for a consistent listen before talk (LBT) failure for a transmission between a base station and the UE, determine whether to perform a LBT recovery response based on the monitoring, detect a trigger, and cancel the LBT recovery response or resetting the monitoring based on the trigger.

In another aspect of the disclosure, a method, a computer-readable medium, and an apparatus are provided. The apparatus may be a base station. The apparatus may transmit a RRC reconfiguration message to a user equipment (UE) reconfiguring a parameter of the UE, and transmit a listen before talk (LBT) failure response cancellation indicator to the UE based on the parameter.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
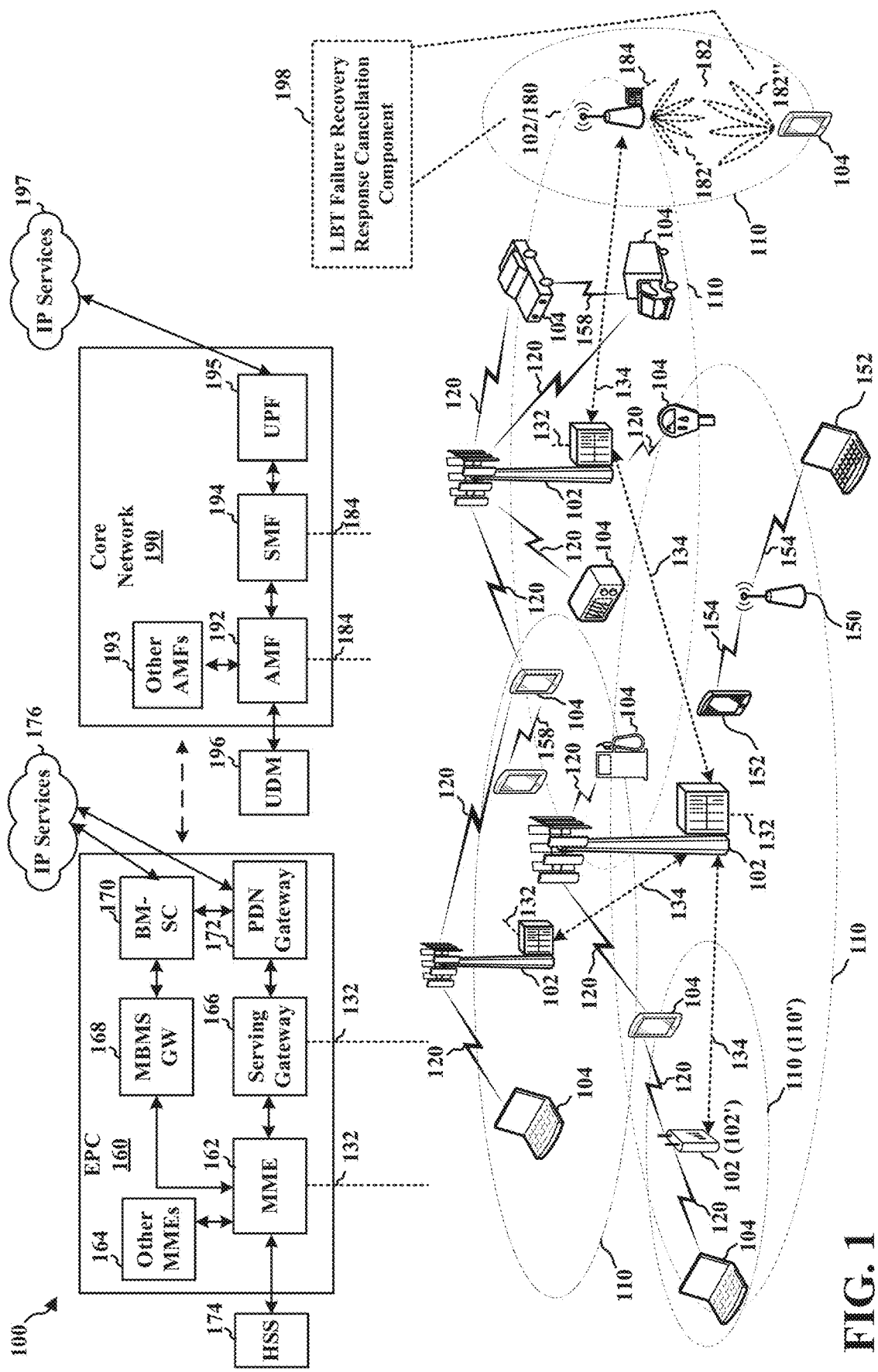
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the base station 180 may include a listen before talk (LBT) failure recovery response cancellation component 198 be configured to determine consistent LBT failures, perform consistent LBT failure recovery responses, and cancel planned consistent LBT failure recovery responses in response to a trigger. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu * 15$ kHz, where pi is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
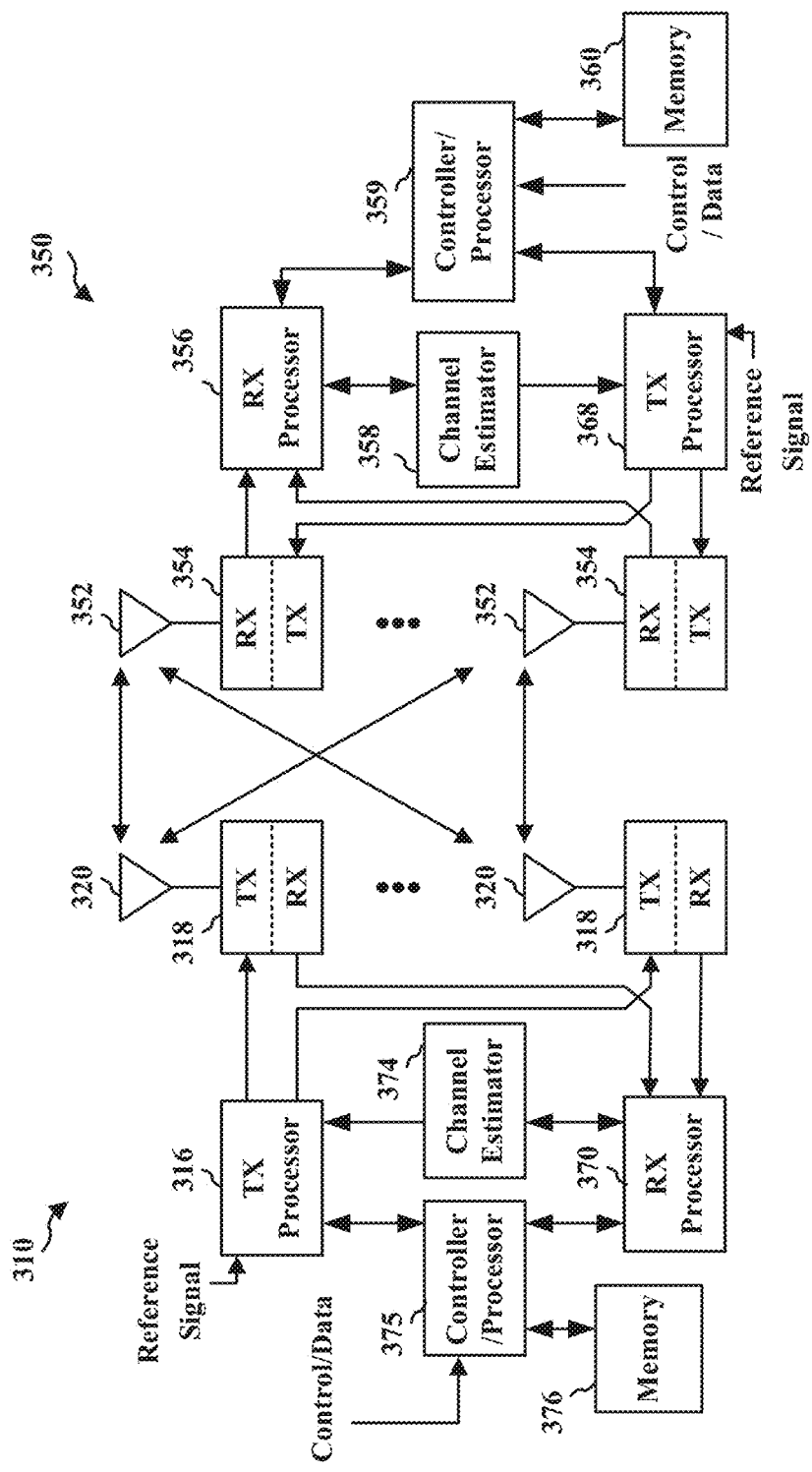
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Figure 4:
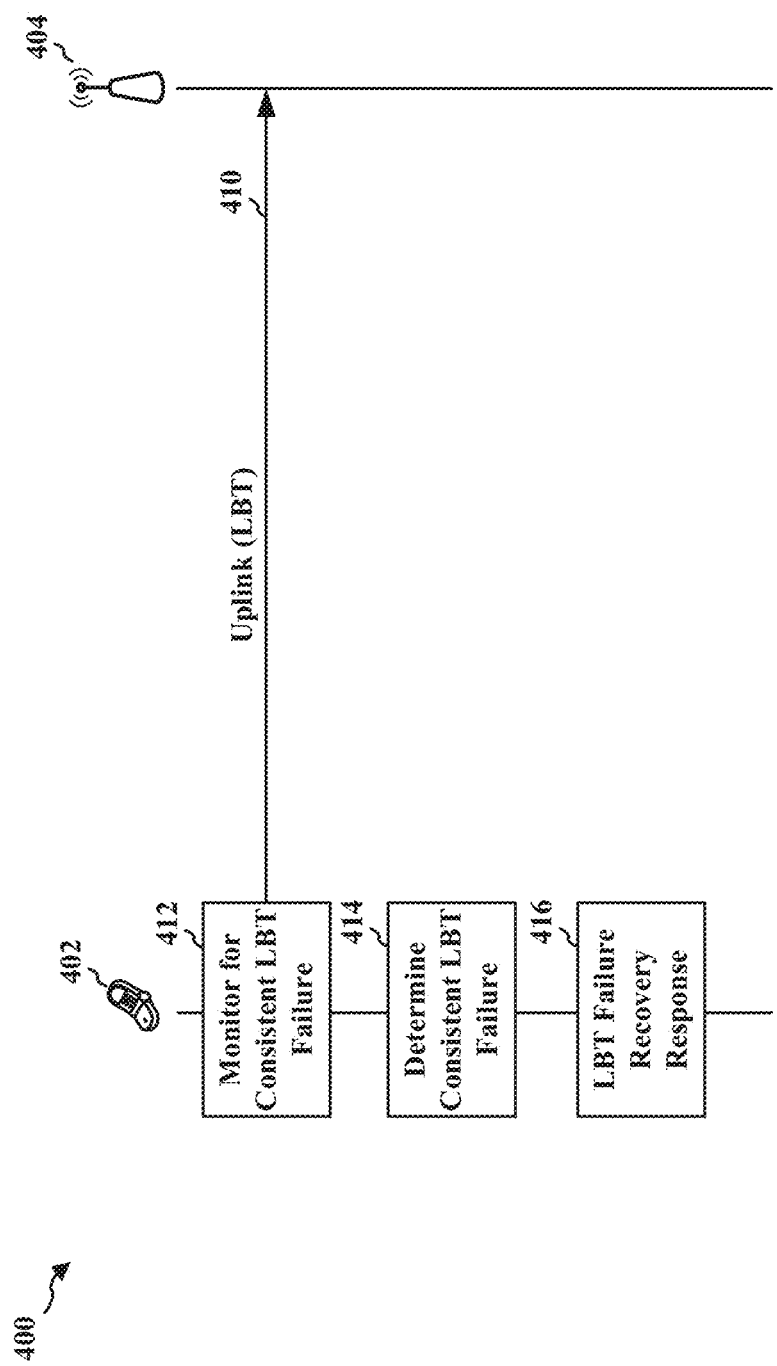
FIG. 4 is a communication flow diagram illustrating a listen before talk (LBT) failure recovery response.

FIG. 4 is a communication flow diagram 400 illustrating a listen before talk (LBT) failure recovery response.

A UE 402 may attempt to transmit uplink data 410 to a base station 404. The UE 402 may transmit the uplink data 410 to the base station 404 on a spectrum that is shared with other protocols. For example, the UE 402 may transmit the uplink data 410 on an unlicensed spectrum shared with WiFi. The base station 404 may include a primary cell for communication on a primary carrier and a secondary cell for communication on other carriers. The UE 402 may be transmitting the uplink data 410 to a primary cell or to a secondary cell of the base station 404. In some aspects, where the UE 402 utilizes dual connectivity, the base station 404 may be a master node or a secondary node.

The UE 402 may utilize a LBT procedure (e.g., a channel clearance procedure) for transmitting the uplink data 410. For example, the UE 402 may monitor the uplink channel to determine if another device is transmitting on the channel, and if no other device is transmitting on the channel, the UE 402 may transmit the uplink data 410. In some aspects, the UE 402 may monitor the channel for a set period of time (e.g., 25 μs) and may transmit on the channel if no other device transmits on the channel during that set period of time (e.g., category 2 LBT). In some aspects, the UE 402 may have a contention window and may select a number randomly within the contention window. The UE 402 may count down from the selected number, and if the channel remains clear until the countdown reaches zero, the UE 402 may transmit on the channel (e.g., category 4 LBT).

As illustrated at 412, the UE 402 may monitor for a consistent LBT failure in its transmission of uplink data 410 to the base station 404. A LBT failure may occur when the UE 402 monitors the uplink channel in the LBT procedure and determines that it cannot transmit on the channel because another device is already transmitting on the channel. A consistent LBT failure may occur when multiple LBT failures occur during a period of time, when multiple LBT failures occur without a set amount of time between failures, or when a set percentage of LBT attempts result in LBT failure.

As illustrated at 414, the UE 402 may determine that a consistent LBT failure has occurred on the uplink. For example, the UE 402 may start a timer and increment a counter when a LBT failure occurs. If another LBT failure occurs before the timer expires, the UE 402 may again increment the counter and reset the timer. If the timer expires without a LBT failure, the UE 402 may reset the counter to zero. If the counter exceeds a threshold, the UE 402 may determine that a consistent LBT failure has occurred.

As illustrated at 416, upon determining that a consistent LBT failure has occurred, the UE 402 may perform a consistent LBT failure recovery response (hereinafter 'recovery response'). The recovery response may depend on whether the consistent LBT failure occurred on a primary cell or a secondary cell. If the consistent LBT failure occurred on a primary cell (or, e.g., on a primary secondary cell (PSCell) where the base station 404 is a secondary node), the UE 402 may change the bandwidth part (BWP) used for uplink, RACH with the base station 404 on the new BWP, and may resume transmitting the uplink data 410 on the new BWP. If the consistent LBT failure occurred on a secondary cell, the UE 402 may report the failure to the network (e.g., to the base station 404) and, in some aspects, may stop transmitting the uplink data 410 to the base station 404. In response to a report indicating a consistent LBT failure on a secondary cell, the base station 404 may deactivate or reconfigure the secondary cell.

In some aspects, prior to performing the recovery response illustrated at 416, the UE 402 may detect a trigger. Upon detecting the trigger, the UE 402 may cancel the recovery response (e.g., may not perform the recovery response). In some aspects, even if a consistent LBT failure has not been determined, the UE 402 may reset the monitoring illustrated at 412 in response to the trigger. For example, where the UE 402 increments a counter based on LBT failures to determine a consistent LBT failure, the UE 402 may set the counter to zero in response to the trigger. Examples of a trigger will be discussed below.

Figure 5:
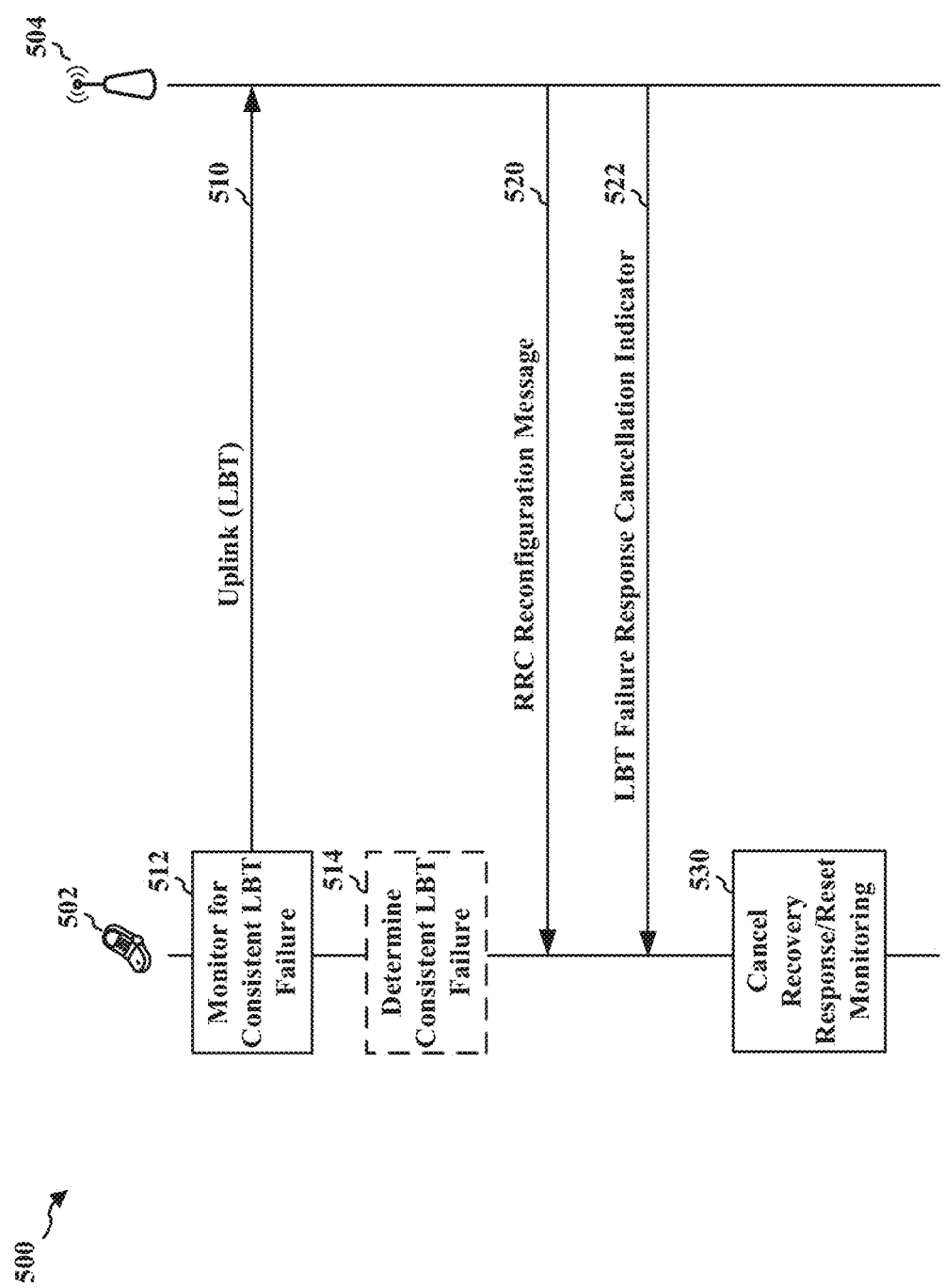
FIG. 5 is a communication flow diagram illustrating a recovery response cancellation based on a received indicator.

FIG. 5 is a communication flow diagram 500 illustrating a recovery response cancellation based on a received indicator. A UE 502 may transmit uplink data 510 to a base station 504 using a LBT procedure, and as illustrated at 512, the UE 502 may monitor for consistent LBT failure in its transmission of the uplink data 510 to the base station 504 (e.g., as described above with respect to FIG. 4). In some aspects, as illustrated at 514, the UE 502 may determine that a consistent LBT failure has occurred (e.g., as described above with respect to FIG. 4).

The base station 504 may transmit a RRC reconfiguration message 520 to the UE 502. The RRC reconfiguration message 520 may reconfigure a parameter of the UE 502. The base station 504 may also transmit a LBT failure response cancellation indicator 522 to the UE 502. The LBT failure response cancellation indicator 522 may be incorporated in the RRC reconfiguration message 520, or may be transmitted separately. The LBT failure response cancellation indicator 522 may instruct the UE 502 to cancel recovery responses and/or reset monitoring for consistent LBT failures. In response to receiving the LBT failure response cancellation indicator 522, the UE 502 may cancel a recovery response planned in response to determining a consistent LBT failure illustrated at 514, and/or may reset the monitoring illustrated at 512.

The RRC reconfiguration message 520 may reconfigure parameters of the UE 502 which impact LBT failures, and which may reduce the number of LBT failures experienced or may render a recovery response unnecessary. The base station 504 may transmit the LBT failure response cancellation indicator 522 instructing the UE 502 to cancel recovery responses and/or to reset monitoring for consistent LBT failures associated with the parameters reconfigured by the RRC message 520.

In some aspects, the LBT failure response cancellation indicator 522 may instruct the UE 502 to cancel recovery responses and/or to reset monitoring for consistent LBT failures occurring on a specified BWP, or on a specified cell (e.g., a primary cell or a secondary cell). For example, the base station 504 may determine to transmit the RRC reconfiguration message 520 to reconfigure a parameter of a BWP of the UE 502, to transfer the UE 502 to another BWP, or to reconfigure the communication between the UE 502 and the cell. The LBT failure response cancellation indicator 522 may instruct the UE 502 to cancel recovery responses or reset monitoring based on LBT failures on the reconfigured BWP or reconfigured cell. As illustrated at 530, the UE 502 may cancel a recovery response planned in response to determining a consistent LBT failure on the reconfigured BWP or cell as illustrated at 514, and/or may reset the monitoring on the reconfigured BWP or cell as illustrated at 512.

In some aspects, the LBT failure response cancellation indicator 522 may instruct the UE 502 to cancel recovery responses and/or to reset monitoring for consistent LB failures occurring for a specified type of transmission. The type of transmission may be RACH, PUSCH, PUCCH, or a transmission using a certain LBT type (category 2, category 4)). For example, the base station 504 may determine to transmit the RRC reconfiguration message 520 to reconfigure a parameter associated with the transmission type (e.g., a channel for the transmission type, a LBT parameter, etc.). The LBT failure response cancellation indicator 522 may instruct the UE 502 to cancel recovery responses or reset monitoring based on LBT failures for transmissions of the transmission type. As illustrated at 530, the UE 502 may cancel a recovery response planned in response to determining a consistent LBT failure for a transmission of the transmission type as illustrated at 514, and/or may reset the monitoring of a transmission of the transmission type as illustrated at 512. For example, the cancellation may occur at the MAC layer. The planned recovery response may include reporting the LBT failure in a MAC control element (CE), and cancelling the recovery response may include not sending the MAC CE.

Figure 6:
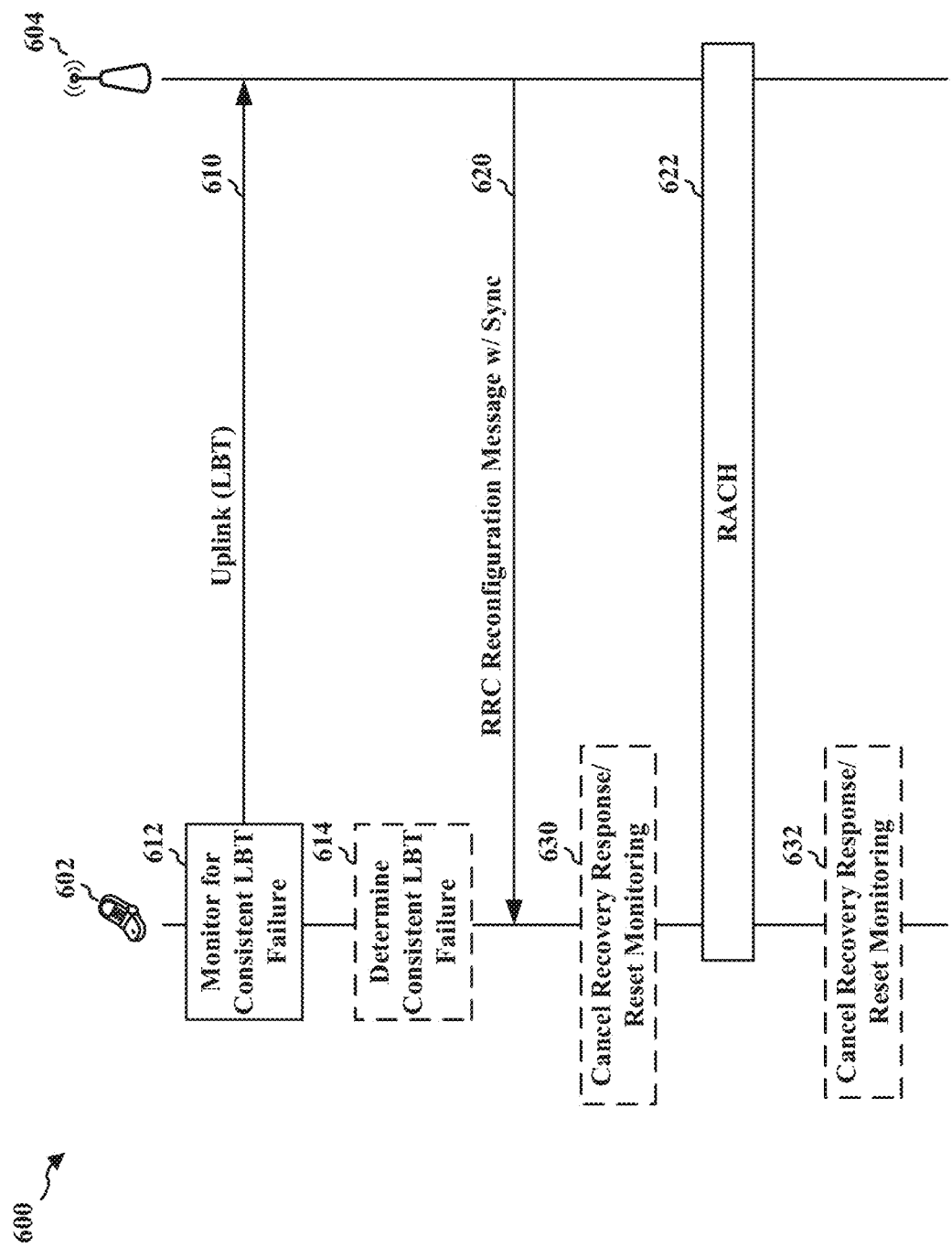
FIG. 6 is a communication flow diagram illustrating a recovery response cancellation based on a RRC reconfiguration with sync.

FIG. 6 is a communication flow diagram 600 illustrating a recovery response cancellation based on a RRC reconfiguration with sync. A UE 602 may transmit uplink data 610 to a base station 604 using a LBT procedure, and as illustrated at 612, the UE 602 may monitor for consistent LBT failure in its transmission of the uplink data 610 to the base station 604 (e.g., as described above with respect to FIG. 4). In some aspects, as illustrated at 614, the UE 602 may determine that a consistent LBT failure has occurred (e.g., as described above with respect to FIG. 4).

The base station 604 may transmit a RRC reconfiguration message 620 to the UE 602 instructing the UE 602 to perform a reconfiguration with sync. The RRC reconfiguration message 620 may be transmitted in response to a handover of the UE 602, or in response to changing the security key of the UE 602. The UE 602 may receive the RRC reconfiguration message 620, and may reset parameters and perform a RACH procedure 622 with the base station 604 in response to the RRC reconfiguration message 620.

Based on receiving the RRC reconfiguration message 620, the UE 602 may cancel a recovery response planned in response to determining a consistent LBT failure illustrated at 614, and/or may reset the monitoring illustrated at 612. In some aspects, the UE 602 may cancel the recovery response or reset monitoring upon receiving the RRC reconfiguration message 620, as illustrated at 630. In some aspects, the UE 602 may cancel the recovery response or reset monitoring upon completion of the RACH procedure 622, as illustrated at 632.

The UE 602 may cancel recovery responses or reset monitoring, as illustrated at 630 and 632, for a subset of cells of the base station 604 in response to the RRC reconfiguration message 620. In some aspects, the UE 602 may cancel recovery responses or reset monitoring for transmissions to the primary cell of the base station 604, but not for transmissions to the secondary cell(s) of the base station 604. In some aspects, the UE 602 may cancel recovery responses and reset monitoring for transmissions to the primary cell and all of the secondary cells of the base station 604. In some aspects, the UE 602 may cancel recovery responses and reset monitoring for transmissions to the primary cell of the base station 604 and to the secondary cells of the base station 604 which are impacted by parameters reconfigured based on the RRC reconfiguration message with sync 620.

Figure 7:
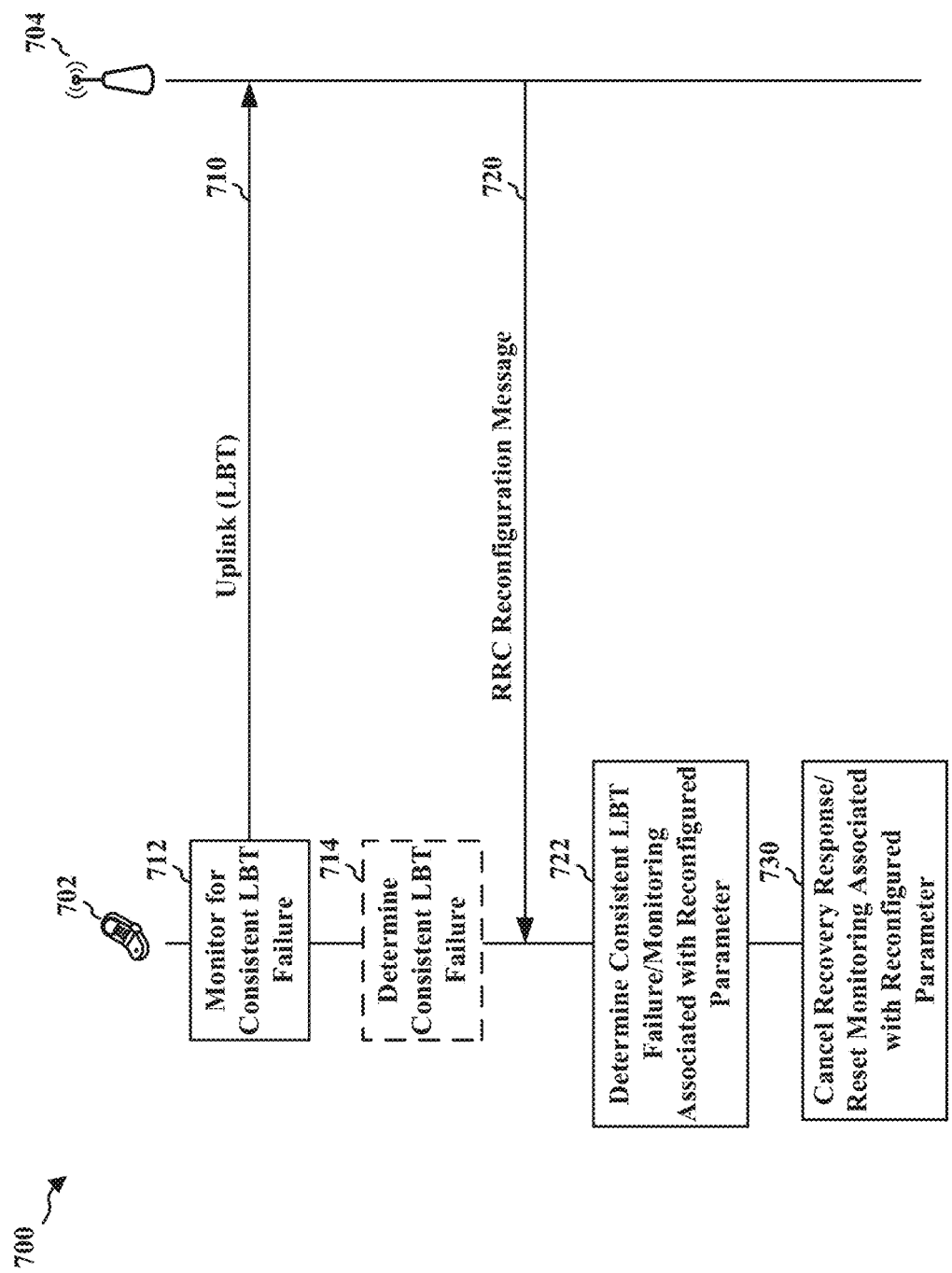
FIG. 7 is a communication flow diagram illustrating a recovery response cancellation based on a reconfigured parameter.

FIG. 7 is a communication flow diagram 700 illustrating a recovery response cancellation based on a reconfigured parameter. A UE 702 may transmit uplink data 710 to a base station 704 using a LBT procedure, and as illustrated at 712, the UE 702 may monitor for consistent LBT failure in its transmission of the uplink data 710 to the base station 704 (e.g., as described above with respect to FIG. 4). In some aspects, as illustrated at 714, the UE 702 may determine that a consistent LBT failure has occurred (e.g., as described above with respect to FIG. 4).

The base station 704 may reconfigure a parameter of the UE 702. For example, the base station 704 may transmit a RRC reconfiguration message 720 to the UE 702, and the RRC reconfiguration message 720 may reconfigure a parameter of the UE 702. As illustrated at 722, the UE 702 may determine that a consistent LBT failure determined at 714, and/or monitoring illustrated at 712, is associated with the parameter reconfigured by the RRC reconfiguration message 720.

In some aspects, the RRC reconfiguration message 720 may reconfigure the BWP for the UE 702 to transmit the uplink data 710, or may reconfigure a parameter of the BWP on which the UE 702 transmits the uplink data 710. At 722, the UE 702 may determine that consistent LBT failures on that BWP are associated with the reconfigured parameter, and may determine that monitoring for consistent LBT failures on that BWP is associated with the reconfigured parameter.

In some aspects, the RRC reconfiguration message 720 may reconfigure the LBT subband or subbands for the UE 702. An LBT subband may also be referred to as a RB set. The LBT subband or subbands for the UE 702 may be the RB set or sets containing the active BWP for the UE 702. The RRC reconfiguration message 720 may reconfigure the LBT subband or subbands for the UE 702 by configuring the BWP for the UE 702 to be in one or more different subbands. At 722, the UE 702 may determine that consistent LBT failures on that subband or subbands are associated with the reconfigured parameter, and may determine that monitoring for consistent LBT failures on that subband or subbands is associated with the reconfigured parameter.

In some aspects, the RRC reconfiguration message 720 may reconfigure the LBT detection/recovery procedure for the UE 702. For example, the RRC reconfiguration message 720 may change the value of a timer or a counter used to determine if a consistent LBT failure has occurred (e.g., as described above with respect to 414), or may disable LBT detection and recovery. At 722, the UE 702 may determine that consistent LBT failures determined using the previous detection/recovery procedure are associated with the reconfigured parameter, and may determine that monitoring for consistent LBT failures using the previous detection/recovery procedure is associated with the reconfigured parameter.

In some aspects, the RRC reconfiguration message 720 may reconfigure a LBT parameter for the UE 702 (e.g., the channel access priority class CAPC). At 722, the UE 702 may determine that consistent LBT failures determined using the previous LBT parameter are associated with the reconfigured parameter, and may determine that monitoring for consistent LBT failures using the previous LBT parameter is associated with the reconfigured parameter.

As illustrated at 730, the UE 702 may cancel a recovery response that is based on a consistent LBT failure which was determined, at 722, to be associated with the reconfigured parameter, and/or may reset monitoring that is determined, at 722, to be associated with the reconfigured parameter. The UE 702 may perform this cancellation or reset without being instructed to do so by the base station 704.

Figure 8:
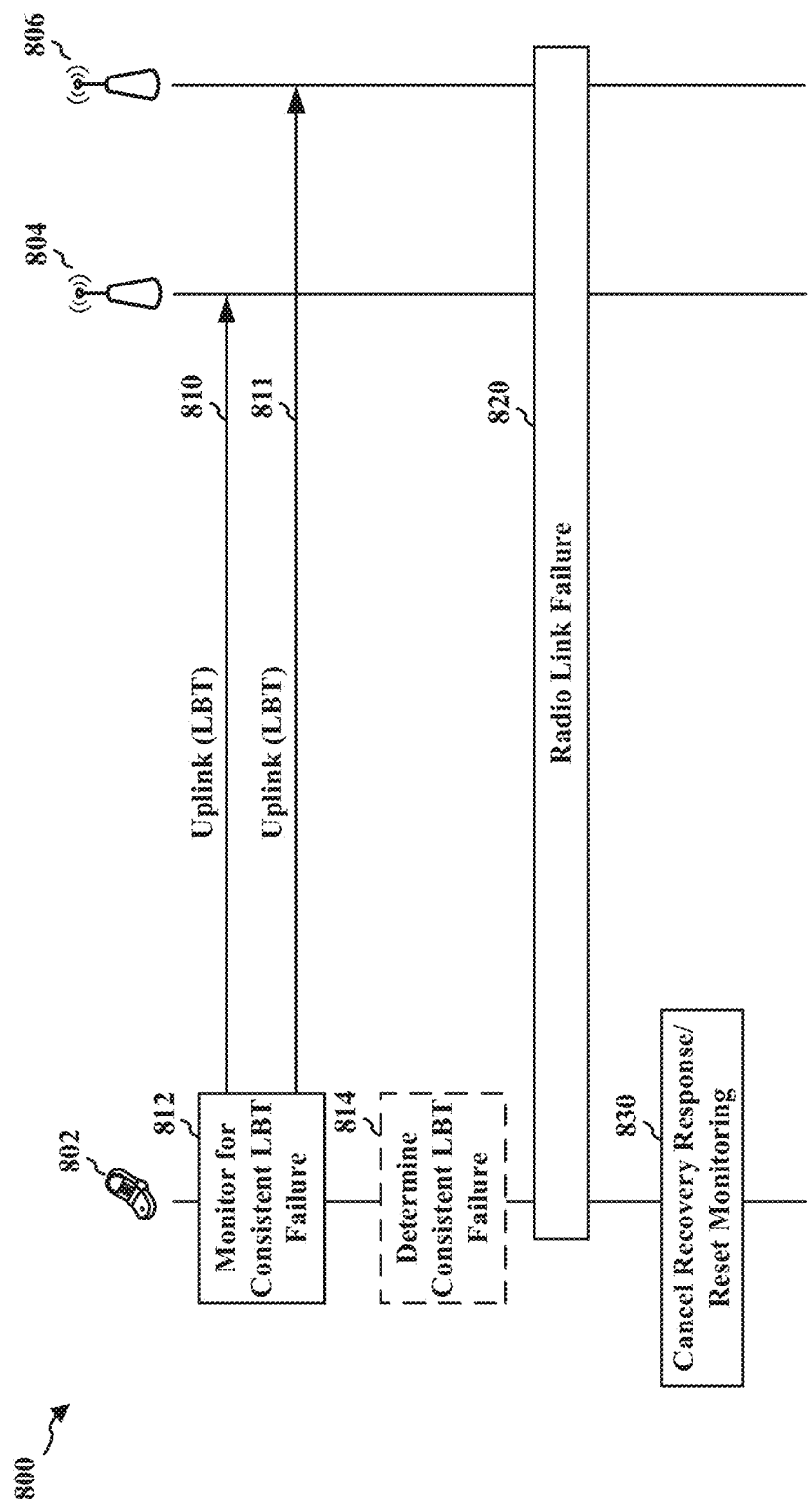
FIG. 8 is a communication flow diagram illustrating a recovery response cancellation based on a radio link failure.

FIG. 8 is a communication flow diagram 800 illustrating a recovery response cancellation based on a radio link failure. The UE 802 may be utilizing dual connectivity to transmit on multiple component carriers. For example, the UE 802 may transmit uplink data 810 to a master node 804 on a first carrier (e.g., 5g NR) and may transmit uplink data 811 to a secondary node 806 on a second carrier (e.g., LTE). The UE 802 may transmit both the uplink data 810 and the uplink data 811 using a LBT procedure. As illustrated at 812, the UE 802 may monitor for consistent LBT failure in its transmission of the uplink data 810 to the master node 804 and in its transmission of the uplink data 811 to the secondary node 806 (e.g., as described above with respect to FIG. 4). In some aspects, as illustrated at 814, the UE 802 may determine that a consistent LBT failure has occurred for either transmission (e.g., as described above with respect to FIG. 4).

The UE 802 may detect a radio link failure 820 for the link between the UE 802 and the master node 804 or the link between the UE 802 and the secondary node 806. In response to detecting the radio link failure 820, the UE 802 may cancel a recovery response planned based on determining a consistent LBT failure and/or may reset monitoring for a consistent LBT failure as illustrated at 830.

In some aspects, where the radio link failure 820 is for a link between the UE 802 and a PSCell of the secondary node 806, the UE 802 may cancel recovery responses based on consistent LBT failures for transmissions to secondary cells of the secondary node 806, and/or may reset monitoring for consistent LBT failures for transmissions to secondary cells of the secondary node 806. In some aspects, (e.g., aspects where master cell group recovery is not enabled) where the radio link failure 820 is for a link between the UE 802 and a primary cell of the master node 804, the UE 802 may cancel recovery responses based on consistent LBT failures for transmissions to secondary cells of the master node 804 and for transmissions to secondary cells of the secondary node 806.

In some aspects, the UE 802 may be configured to utilize master cell group recovery. Where the radio link failure 820 is for a link between the UE 802 and a primary cell of the master node 804, the UE 802 may notify the secondary node 806 of the radio link failure 820 and the secondary node 806 may notify the master node 804 of the radio link failure 820. The master node 804 may send some instructions to the secondary node 806 to compensate for the failure of the link between the master node 804 and the UE 802. The UE 802 may cancel recovery responses based on consistent LBT failures for transmissions to secondary cells of the master node 804, but may not cancel recovery responses based on consistent LBT failures for transmissions to secondary cells of the secondary node 806.

Figure 9:
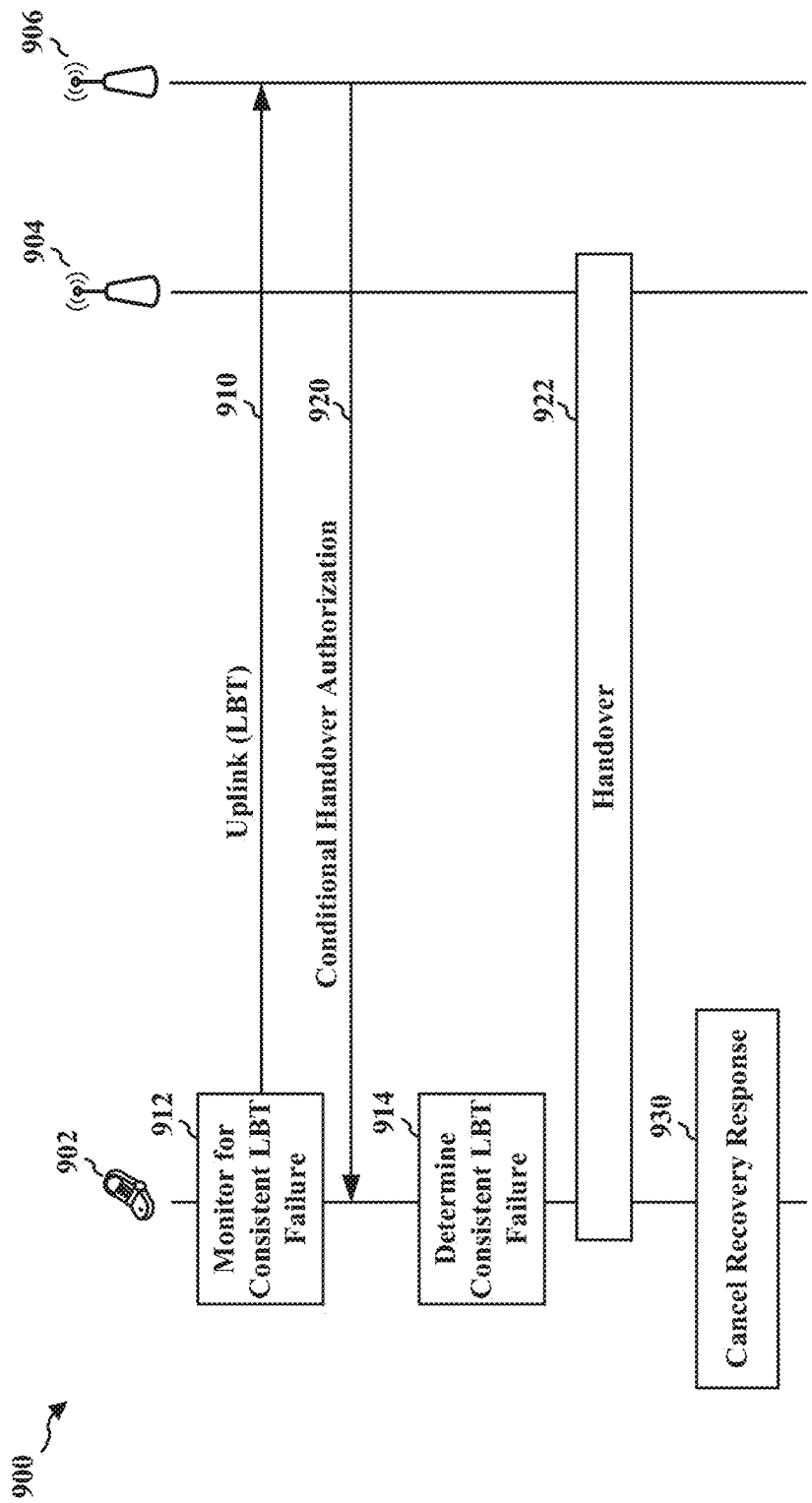
FIG. 9 is a communication flow diagram illustrating a recovery response cancellation in a conditional handover.

FIG. 9 is a communication flow diagram 900 illustrating a recovery response cancellation in a conditional handover. A UE 902 may transmit uplink data 910 to a source base station 906 using a LBT procedure, and as illustrated at 912, the UE 902 may monitor for consistent LBT failure in its transmission of the uplink data 910 to the source base station 906 (e.g., as described above with respect to FIG. 4).

The source base station 906 may transmit a conditional handover authorization 920 to the UE 902, indicating to the UE 902 that the UE 902 may proceed with a handover to another candidate base station without explicit instruction to do so from the source base station 906. The conditional handover authorization 920 may include conditions that should be met prior to proceeding with the handover, such as channel measurements between the UE 902 and the source base station 906 being below a threshold level and/or channel measurements between the UE 902 and the candidate base station being over a threshold level.

In some aspects, as illustrated at 914, the UE 902 may determine that a consistent LBT failure has occurred (e.g., as described above with respect to FIG. 4). The determination may be made after receiving the conditional handover authorization 920, as illustrated in FIG. 9, or in some aspects may be made before receiving the conditional handover authorization 920.

As illustrated at 922, prior to performing a recovery response based on a determined consistent LBT failure, the UE 902 may initiate a handover procedure 922 with a target base station 904 based on the conditional handover authorization 920. For example, the UE 902 may perform channel measurements for the channel between the UE 902 and the target base station 904, determine that the measurements support handover to the target base station 904, and determine that it is authorized to handover to the target base station 904 based on the conditional handover authorization 920.

Upon completion of the handover procedure 922, the UE 902 may cancel a recovery response for a consistent LBT failure determined based on transmissions to the source base station 906 (e.g., determined as illustrated at 914).

In some aspects, if the UE 902 determined the consistent LBT failure but did not initiate the recovery response prior to initiation of the handover 922, the UE 902 may suspend or postpone the recovery response until completion of the handover procedure 922. If the handover procedure is successful, the UE 902 may cancel the recovery response as illustrated at 930. If the handover procedure fails, the UE 902 may resume the recovery response.

Figure 10:
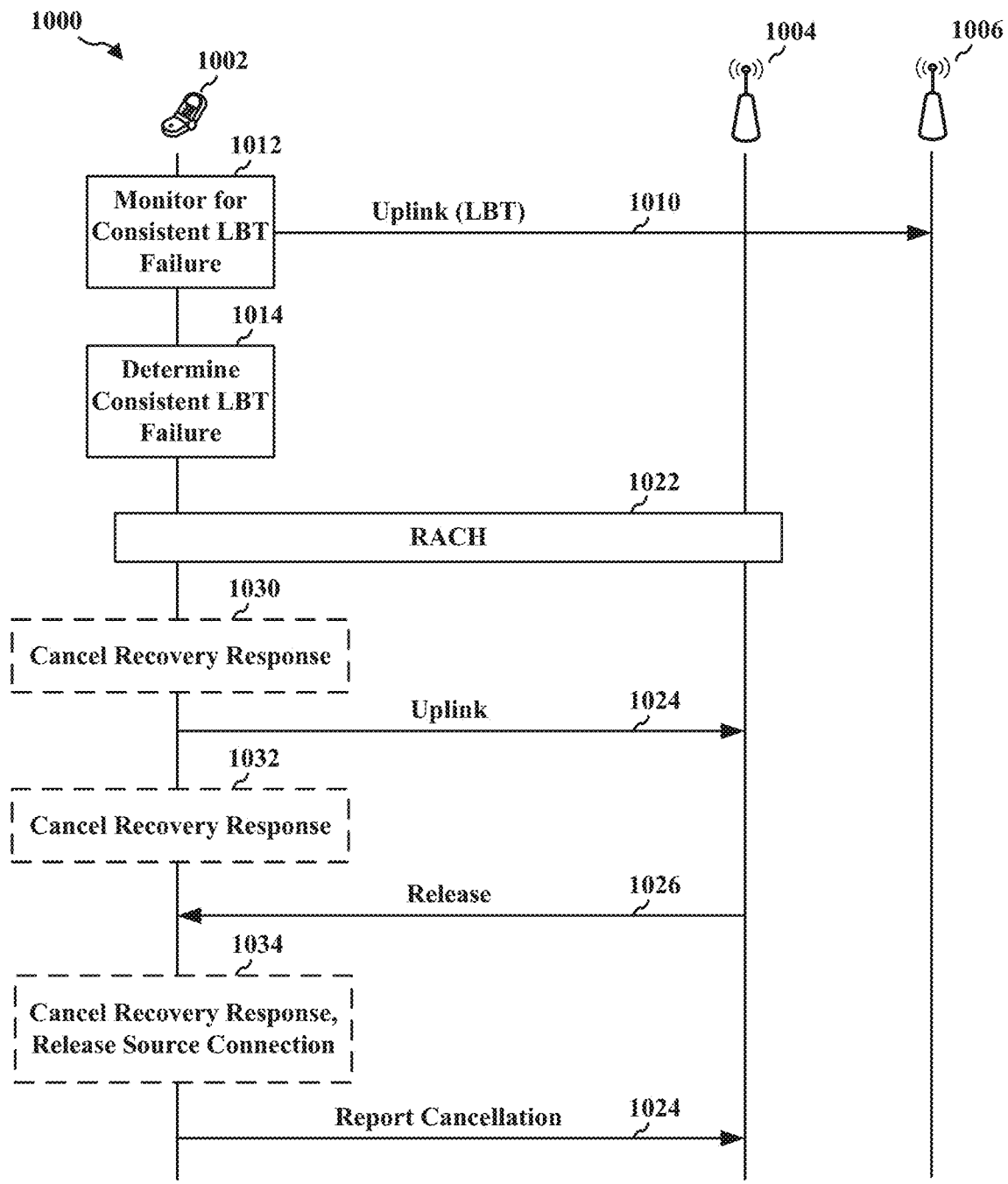
FIG. 10 is a communication flow diagram illustrating a recovery response cancellation in a dual active protocol stack handover.

FIG. 10 is a communication flow diagram 1000 illustrating a recovery response cancellation in a dual active protocol stack handover. A UE 1002 may transmit uplink data 1010 to a source base station 1006 using a LBT procedure, and as illustrated at 1012, the UE 1002 may monitor for consistent LBT failure in its transmission of the uplink data 1010 to the source base station 1006 (e.g., as described above with respect to FIG. 4).

In a dual active protocol stack system, the UE 1002 may be able to maintain its connection with the source base station 1006 during a handover until instructed to release the connection by a target base station 1004, in order to reduce or eliminate an interruption in uplink/downlink based on a handover. The UE 1002 may determine to handover to the target base station 1004 (e.g., the source base station 1006 may instruct the UE 1002 to handover to the target base station 1004). The UE 1002 may perform a RACH procedure 1022 with the target base station 1004. After completion of the RACH procedure 1022, the UE may switch its uplink to the target base station 1004, and may transmit uplink data to the target base station 1004. Once the UE 1002 has switch its uplink to the target base station 1004, the target base station 1004 may transmit a release command 1026 to the UE 1002. Upon receiving the release command 1026, the UE 1002 may release the connection with the source base station 1006.

In some aspects, as illustrated at 1014, the UE 1002 may determine that a consistent LBT failure has occurred (e.g., as described above with respect to FIG. 4) for transmissions to the source base station 1006 before the UE 1002 releases the connection with the source base station 1006. For example, the UE 1002 may determine that the consistent LBT failure has occurred before the UE 1002 determines to handover to the target base station 1004 or before the UE 1002 transfers its uplink to the target base station 1004.

Based on the handover to the target base station 1004, the UE 1002 may cancel a recovery response planned in response to determining a consistent LBT failure illustrated at 1014. In some aspects, the UE 1002 may cancel the recovery response upon completion of the RACH procedure 1022 as illustrated at 1030. In some aspects, the UE 1002 may cancel the recovery response upon switching the uplink to the target base station 1004 as illustrated at 1032. In some aspects, the UE 1002 may cancel the recovery response and release the connection with the source base station 1006 upon receiving the release command 1026, as illustrated at 1034. In some aspects, upon cancelling the recovery response, the UE 1002 may transmit a report 1024 to the target base station 1004 indicating that the consistent LBT failure was determined for the source base station 1006 or indicating that the recovery response was cancelled.

Figure 11:
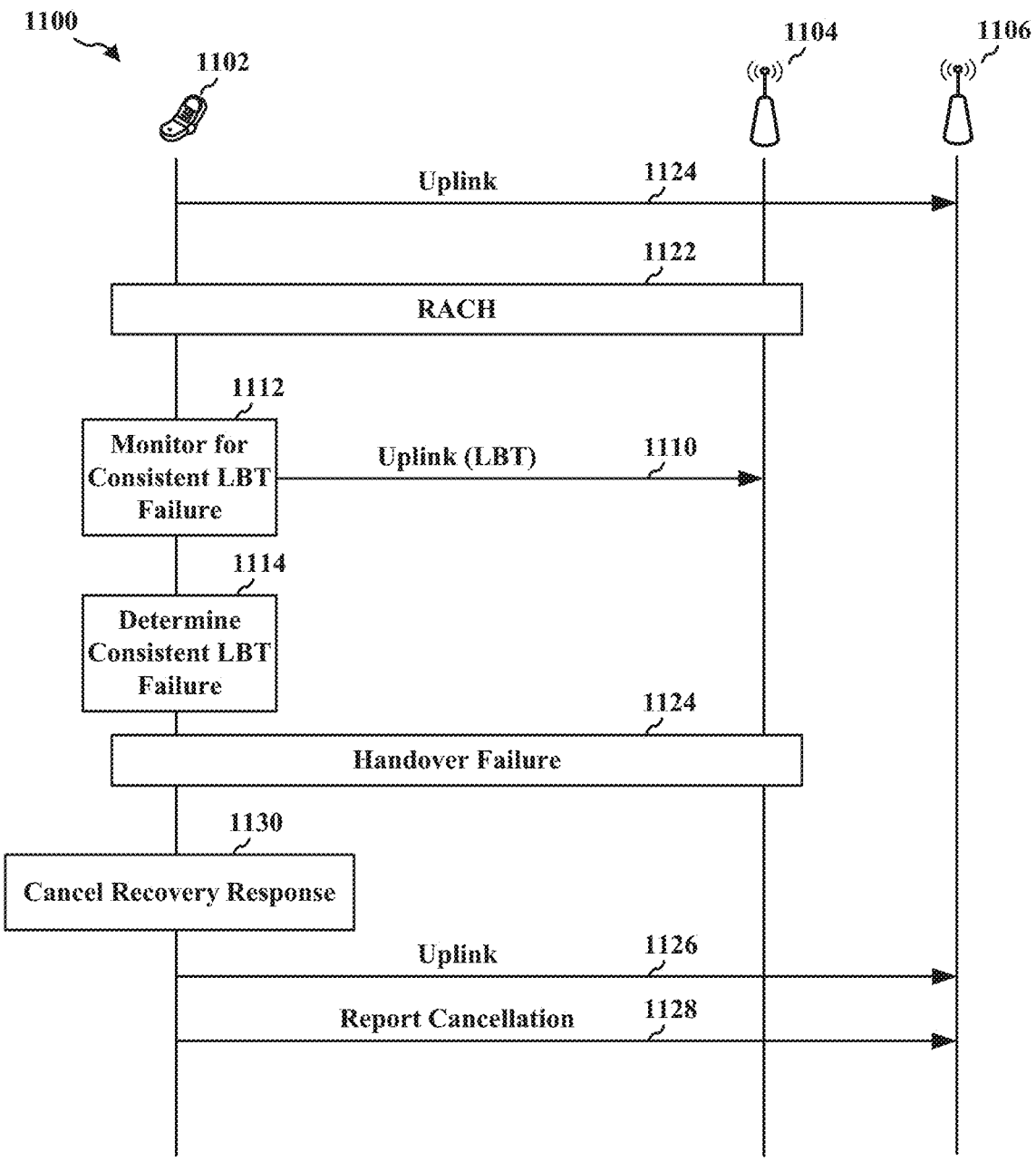
FIG. 11 is a communication flow diagram illustrating a recovery response cancellation in a failed dual active protocol stack handover.

FIG. 11 is a communication flow diagram 1100 illustrating a recovery response cancellation in a failed dual active protocol stack handover. A UE 1102 may initially be connected with a source base station 1106. The UE 1102 may transmit uplink data 1124 to the source base station.

The UE 1102 may determine to handover to a target base station 1104 (e.g., the source base station 1106 may instruct the UE 1102 to handover to the target base station 1104). The UE 1102 may perform a RACH procedure 1122 with the target base station 1104. After completion of the RACH procedure 1122, the UE 1102 may switch its uplink to the target base station 1104. The UE 1102 may transmit uplink data 1110 to the target base station 1104 using a LBT procedure, and as illustrated at 1112, the UE 1102 may monitor for consistent LBT failure in its transmission of the uplink data 1110 to the target base station 1104 (e.g., as described above with respect to FIG. 4).

As illustrated at 1114, the UE 1102 may determine that a consistent LBT failure has occurred (e.g., as described above with respect to FIG. 4) in its transmission of uplink data 1110 to the target base station 1104.

As illustrated at 1124, the handover of the UE 1102 to the target base station 1104 may fail. For example, the RACH procedure 1122 may fail, or a radio link failure between the UE 1102 and the target base station 1104 may occur before the connection with the source base station 1106 is released. Upon failure of the handover, as illustrated at 1130, the UE 1102 may cancel a recovery response planned in response to determining a consistent LBT failure in transmissions to the target base station 1104.

As the target base station 1104 has not instructed the UE 1102 to release the connection with the source base station 1106, the UE 1102 is still connected with the source base station 1106. The UE 1102 may fall back to the source base station 1106, switching its uplink to the source base station 1106 and transmitting uplink data 1126 to the source base station 1106. In some aspects, the UE 1102 may transmit a report 1128 to the source base station 1106 indicating that the consistent LBT failure was determined for the source base station 1106 or indicating that the recovery response was cancelled.

The above examples have been described in reference to consistent LBT failures on uplink transmissions. In some aspects, however, a UE may perform the above examples based on a consistent failure on downlink transmissions. For example, a UE may monitor downlink communications received from a base station. The base station may attempt to transmit reference signals at regular intervals, and may utilize a LBT procedure for transmitting the downlink transmissions. While monitoring for the downlink communications from the base station, the UE may determine that a reference signal was not received, and may determine that the base station experienced an LBT failure for that downlink transmission. The UE may monitor for consistent LBT failures on the downlink transmissions in the same way described above with respect to monitoring for consistent LBT failures on uplink transmissions. Upon determining a consistent LBT failure for downlink transmissions, the UE may perform a recovery operation. In some aspects, a UE may cancel the recovery operation, or reset the monitoring for consistent LBT failures on the downlink transmissions, in the manner described above in the examples of FIGS. 5, 6, 7, 8, 9, and 11.

Figure 12:
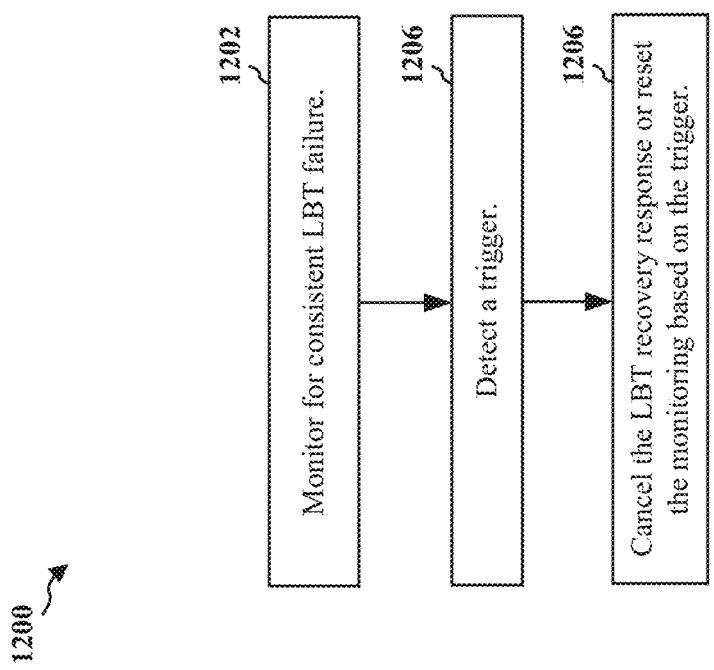
FIG. 12 is a flowchart of a method of wireless communication.

FIG. 12 is a flowchart 1200 of a method of wireless communication. The method may be performed by a UE (e.g., the UEs 350, 402, 502, 602, 702, 802, 902, 1002, 1102).

At 1202, the UE may monitor for a consistent LBT failure for a transmission between a base station and the UE. A LBT recovery response may be initiated upon detecting a consistent LBT failure. For example, UE may determine whether to perform a LBT recovery response based on the monitoring. The transmission may be an uplink transmission. The transmission may be a downlink transmission. The transmission may be to a primary cell of the base station. The transmission may be to a secondary cell of the base station.

At 1206, the UE may detect a trigger. In some aspects, the UE may receive a RRC reconfiguration message from the base station, the RRC reconfiguration message may reconfigure a parameter of the UE related to the transmission, and the trigger may be receiving the RRC reconfiguration message. The parameter may be associated with a bandwidth part of the transmission. The parameter may be associated with a LBT sub band of the transmission. The parameter may be associated with the monitoring for the consistent LBT failure. The parameter may be a parameter of a LBT procedure for the transmission. The trigger may be detecting a radio link failure. The trigger may be a conditional handover of the UE to a target base station.

In some aspects, the UE may receive a RRC reconfiguration message from the base station, the RRC reconfiguration message reconfiguring a parameter of the UE related to the transmission, and the UE may receive a LBT failure response cancellation indicator from the base station corresponding to the RRC message. The trigger may be receiving the LBT failure response cancellation indicator. The LBT failure response cancellation indicator may identify a bandwidth part of the transmission, a channel of the transmission with the consistent LBT failure, or a LBT type of the transmission.

In some aspects, the UE may receive a RRC reconfiguration message indicating a reconfiguration with sync, and the trigger may be based on the RRC reconfiguration message. The trigger may be receiving the RRC reconfiguration message. The trigger may be the completion of a sync procedure initiated by the RRC reconfiguration message with sync.

In some aspects, the trigger may be based on a dual active protocol stack handover of the UE to a target base station. The trigger may be completion of a random access channel procedure of the dual active protocol stack handover. The transmission may be an uplink transmission, and the trigger may be the UE switching its uplink to the target base station. The trigger may be receiving a release command from the target base station instructing the UE to release a connection with the base station. The trigger may be a failure of a dual active protocol stack handover of the UE to the base station.

At 1208, the UE may cancel the LBT recovery response or resetting the monitoring based on the trigger. The transmission may be to a primary cell of the base station, and the LBT recovery response may be changing the transmission from a first bandwidth part of the UE to a second bandwidth part of the UE. The transmission may be to a secondary cell of the base station, and the recovery response may be reporting the consistent LBT failure to the base station and stopping the transmission.

In some aspects, the UE may receive a RRC reconfiguration message indicating a reconfiguration with sync, and the trigger may be based on the RRC reconfiguration message. The trigger may be receiving the RRC reconfiguration message. The trigger may be the completion of a sync procedure initiated by the RRC reconfiguration message with sync. The UE may cancel all LBT recovery responses or reset all monitoring for consistent LBT failures for transmissions to a primary cell in response to detecting the trigger. The UE may cancel all LBT recovery responses or reset all monitoring for consistent LBT failures for transmissions to a primary cell in response to detecting the trigger, and may cancel all LBT recovery responses or reset all monitoring for consistent LBT failures for transmissions to a secondary cell in response to detecting the trigger. The UE may cancel all LBT recovery responses or reset all monitoring for consistent LBT failures for transmissions to a primary cell in response to detecting the trigger, and may determine whether to cancel all LBT recovery responses or reset all monitoring for consistent LBT failures for transmissions to a secondary cell in response to detecting the trigger based on whether the RRC reconfiguration message reconfigures a parameter associated with the secondary cell.

In some aspects, the trigger may be detecting a radio link failure. The base station may be a secondary node, the radio link failure may be with a primary secondary cell of the base station, and the UE may cancel all LBT recovery responses or reset all monitoring for consistent LBT failures for transmissions to secondary cells of the base station in response to detecting the radio link failure. The base station may be a master node, the radio link failure may be with a primary cell of the base station, master cell group recovery may be enabled, and the UE may cancel all LBT recovery responses or reset all monitoring for consistent LBT failures for transmissions to secondary cells of the base station in response to detecting the radio link failure. The base station may be a master node, the radio link failure may be with a primary cell of the base station, and the UE may cancel all LBT recovery responses or reset all monitoring for consistent LBT failures for transmissions to secondary cells of the base station and to secondary cells of a secondary node in response to detecting the radio link failure.

Figure 13:
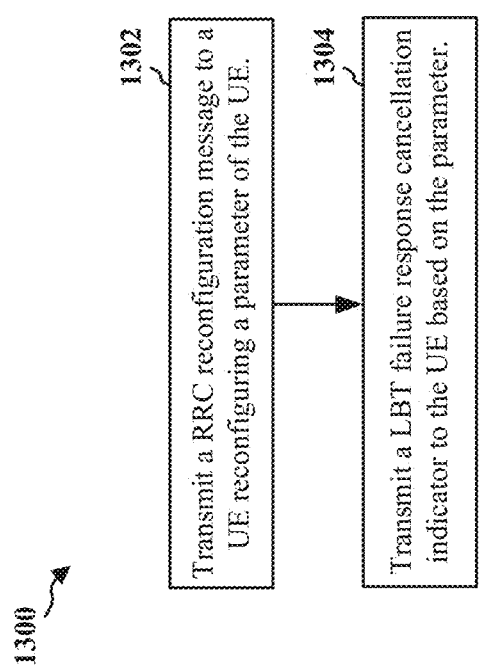
FIG. 13 is a flowchart of a method of wireless communication.

FIG. 13 is a flowchart 1300 of a method of wireless communication. The method may be performed by a base station or a node of a base station (e.g., the base station 310, 404, 504, 604, 704, 804, 806, 904, 906, 1004, 1006, 1104, 1106).

At 1302, the base station may transmit a RRC reconfiguration message to a user equipment (UE) reconfiguring a parameter of the UE. The parameter may be associated with a bandwidth part of a transmission between the UE and the base station, a channel of the transmission, or a LBT type of the transmission. The transmission may be an uplink transmission.

At 1304, the base station may transmit a LBT failure response cancellation indicator to the UE based on the parameter. The LBT failure response cancellation indicator may identify the bandwidth part of the transmission, the channel of the transmission, or the LBT type of the transmission.

Figure 14:
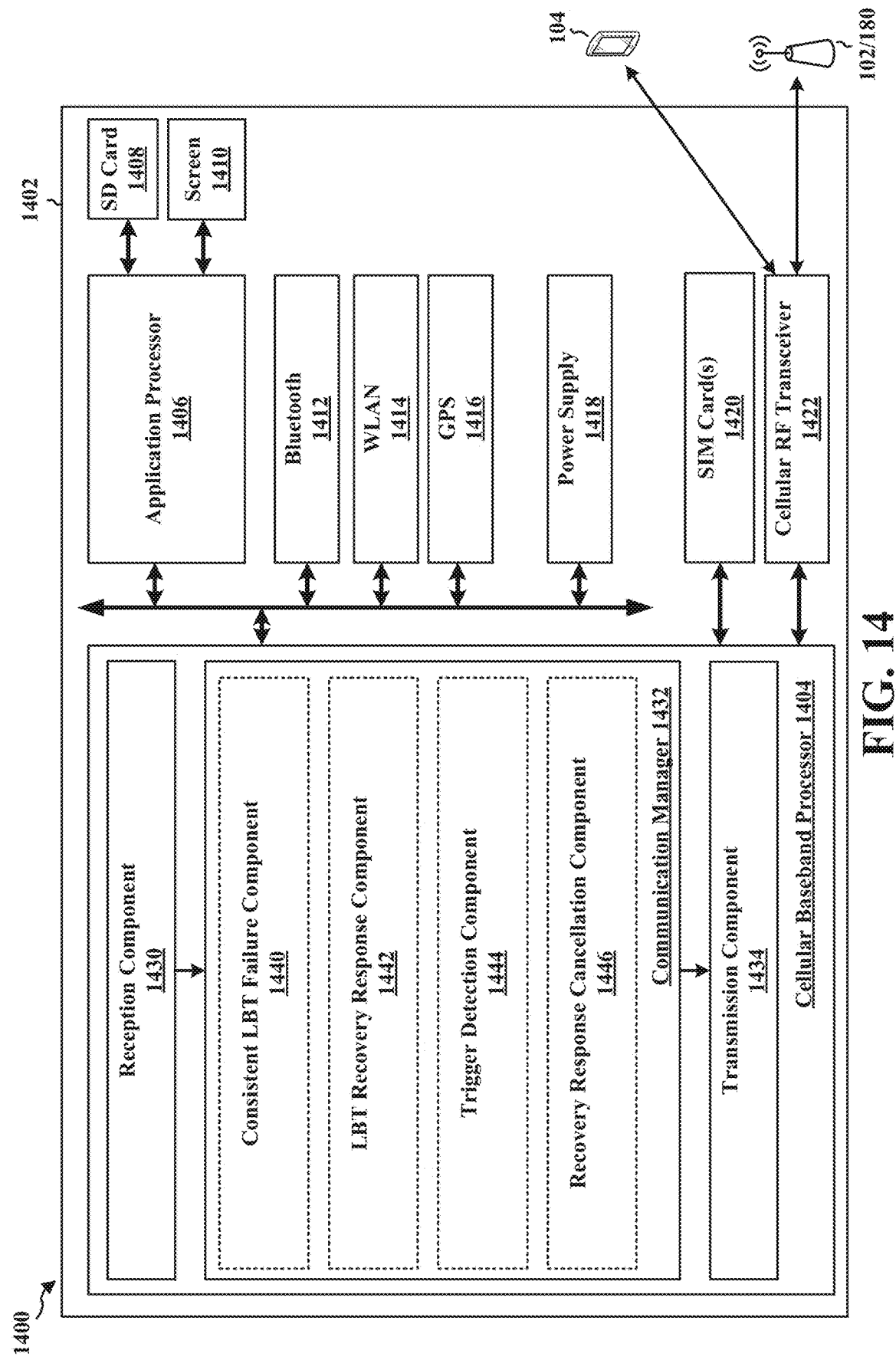
FIG. 14 is a diagram illustrating an example of a hardware implementation for an apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a consistent LBT failure component 1440 that is configured to monitor for a consistent LBT failure for a transmission between a base station and the UE, e.g., as described in connection with 1202 of FIG. 12. The communication manager 1432 further includes a LBT recovery response component 1442 that is configured to determine whether to perform a LBT recovery response based on the monitoring performed by the consistent LBT failure component 1440, e.g., as described in connection with 1204 of FIG. 12. The communication manager 1432 further includes a trigger detection component 1444 that is configured to detect a trigger, e.g., as described in connection with 1206 of FIG. 12. The communication manager 1432 further includes a recovery response cancellation component 1446. In some aspects, the recovery response cancellation component 1446 is configured to cancel an LBT recovery response (e.g., triggered by the LB recovery response component 1442) based on the trigger detected by the trigger detection component 1444, e.g., as described in connection with 1208 of FIG. 12. In some aspects, In some aspects, the recovery response cancellation component 1446 is configured to reset the monitoring for the consistent LBT failure by the consistent LBT failure component 1440 based on the trigger detected by the trigger detection component 1444, e.g., as described in connection with 1208 of FIG. 12.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for monitoring for a consistent listen before talk (LBT) failure for a transmission between a base station and the UE, means for determining whether to perform a LBT recovery response based on the monitoring, means for detecting a trigger, and means for cancelling the LBT recovery response or resetting the monitoring based on the trigger. In some configurations, the apparatus 1402, and in particular the cellular baseband processor 1404, includes means for receiving a RRC reconfiguration message from the base station, the RRC reconfiguration message reconfiguring a parameter of the UE related to the transmission, wherein the trigger is receiving the RRC reconfiguration message. The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
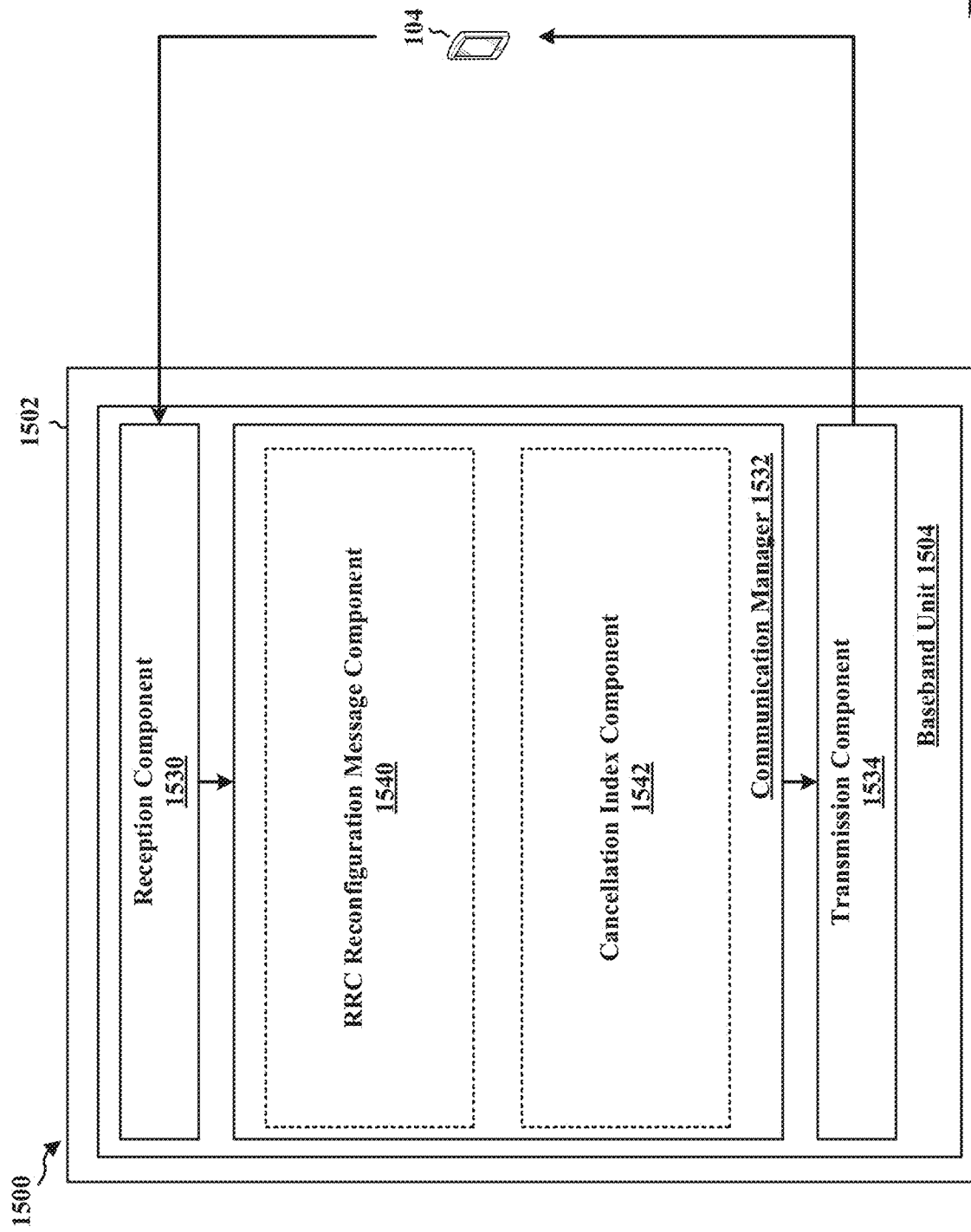
FIG. 15 is a diagram illustrating an example of a hardware implementation for an apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes an RRC reconfiguration message component 1540 that is configured to transmit an RRC reconfiguration message to a UE reconfiguring a parameter of the UE, e.g., as described in connection with 1302 of FIG. 13. The communication manager 1532 further includes a cancellation index component 1542 that is configured to transmit a LB failure response cancellation indicator to the UE based on the parameter, e.g., as described in connection with 1304 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for transmitting an RRC reconfiguration message to a UE reconfiguring a parameter of the UE, and means for transmitting a LBT failure response cancellation indicator to the UE based on the parameter. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Implementation examples are described in the following numbered clauses. The following examples are illustrative only and may be combined with aspects of other embodiments or teachings described herein, without limitation.

1. A method of wireless communication at a user equipment (UE), comprising: monitoring for a consistent listen before talk (LBT) failure for a transmission between a base station and the UE; determining whether to perform a LBT recovery response based on the monitoring; detecting a trigger; and cancelling the LBT recovery response or resetting the monitoring based on the trigger.

2. The method of clause 1, wherein the transmission is to a primary cell of the base station, and wherein the LBT recovery response is changing the transmission from a first bandwidth part of the UE to a second bandwidth part of the UE.

3. The method of clause 1, wherein the transmission is to a secondary cell of the base station, and the recovery response is reporting the consistent LBT failure to the base station and stopping the transmission.

4. The method of any of clauses 1-3, further comprising receiving a RRC reconfiguration message from the base station, the RRC reconfiguration message reconfiguring a parameter of the UE related to the transmission, wherein the trigger is receiving the RRC reconfiguration message.

5. The method of any of clauses 1-4, wherein the parameter is associated with a bandwidth part of the transmission.

6. The method of any of clauses 1-4, wherein the parameter is associated with a LBT sub band of the transmission.

7. The method of any of clauses 1-4, wherein the parameter is associated with the monitoring for the consistent LBT failure.

8. The method of any of clauses 1-4, wherein the parameter is a parameter of a LBT procedure for the transmission.

9. The method of any of clauses 1-3, further comprising: receiving a RRC reconfiguration message from the base station, the RRC reconfiguration message reconfiguring a parameter of the UE related to the transmission; and receiving a LBT failure response cancellation indicator from the base station corresponding to the RRC message, wherein the trigger is receiving the LBT failure response cancellation indicator.

10. The method of any of clauses 1-3 and 9, wherein the LBT failure response cancellation indicator identifies a bandwidth part of the transmission, a channel of the transmission with the consistent LBT failure, or a LBT type of the transmission.

11. The method of clause 1, further comprising receiving a RRC reconfiguration message indicating a reconfiguration with sync, wherein the trigger is based on the RRC reconfiguration message.

12. The method of any of clauses 1 and 11, wherein the trigger is receiving the RRC reconfiguration message.

13. The method of any of clauses 1 and 11, wherein the trigger is completion of a sync procedure initiated by the RRC reconfiguration message with sync.

14. The method of any of clauses 1 and 11-13, wherein the UE cancels all LBT recovery responses or resets all monitoring for consistent LBT failures for transmissions to a primary cell in response to detecting the trigger.

15. The method of any of clauses 1 and 11-13, wherein the UE cancels all LBT recovery responses or resets all monitoring for consistent LBT failures for transmissions to a primary cell in response to detecting the trigger, and cancels all LBT recovery responses or resets all monitoring for consistent LBT failures for transmissions to a secondary cell in response to detecting the trigger.

16. The method of any of clauses 1 and 11-13, wherein the UE cancels all LBT recovery responses or resets all monitoring for consistent LBT failures for transmissions to a primary cell in response to detecting the trigger, and determines whether to cancel all LBT recovery responses or resets all monitoring for consistent LBT failures for transmissions to a secondary cell in response to detecting the trigger based on whether the RRC reconfiguration message reconfigures a parameter associated with the secondary cell.

17. The method of clause 1, wherein the trigger is detecting a radio link failure.

18. The method of any of clauses 1 and 17, wherein the base station is a secondary node, wherein the radio link failure was with a primary secondary cell of the base station, and wherein the UE cancels all LBT recovery responses or resets all monitoring for consistent LBT failures for transmissions to secondary cells of the base station in response to detecting the radio link failure.

19. The method of any of clauses 1 and 17, wherein the base station is a master node, wherein the radio link failure was with a primary cell of the base station, wherein master cell group recovery is enabled, and wherein the UE cancels all LBT recovery responses or resets all monitoring for consistent LBT failures for transmissions to secondary cells of the base station in response to detecting the radio link failure.

20. The method of any of clauses 1 and 17, wherein the base station is a master node, wherein the radio link failure was with a primary cell of the base station, and wherein the UE cancels all LBT recovery responses or resets all monitoring for consistent LBT failures for transmissions to secondary cells of the base station and to secondary cells of a secondary node in response to detecting the radio link failure.

21. The method of clause 1, wherein the trigger is a conditional handover of the UE to a target base station.

22. The method of clause 1, wherein the trigger is based on a dual active protocol stack handover of the UE to a target base station.

23. The method of any of clauses 1 and 22, wherein the trigger is completion of a random access channel procedure of the dual active protocol stack handover.

24. The method of any of clauses 1 and 22, wherein the transmission is an uplink transmission, and wherein the trigger is the UE switching its uplink to the target base station.

25. The method of any of clauses 1 and 22, wherein the trigger is receiving a release command from the target base station instructing the UE to release a connection with the base station.

26. The method of clause 1, wherein the trigger is a failure of a dual active protocol stack handover of the UE to the base station.

27. The method of any of clauses 1-26, wherein the transmission is an uplink transmission.

28. An apparatus for wireless communication at a user equipment (UE), comprising: means for monitoring for a consistent listen before talk (LBT) failure for a transmission between a base station and the UE; means for determining whether to perform a LBT recovery response based on the monitoring; means for detecting a trigger; and means for cancelling the LBT recovery response or resetting the monitoring based on the trigger.

29. An apparatus for wireless communication at a user equipment (UE), comprising: a memory; and at least one processor coupled to the memory and configured to: monitor for a consistent listen before talk (LBT) failure for a transmission between a base station and the UE; determine whether to perform a LBT recovery response based on the monitoring; detect a trigger; and cancel the LBT recovery response or resetting the monitoring based on the trigger.

30. The apparatus of clause 29, wherein the transmission is to a primary cell of the base station, and wherein the LBT recovery response is changing the transmission from a first bandwidth part of the UE to a second bandwidth part of the UE.

31. The apparatus of clause 29, wherein the transmission is to a secondary cell of the base station, and the recovery response is reporting the consistent LBT failure to the base station and stopping the transmission.

32. The apparatus of any of clauses 29-31, wherein the processor is further configured to receive a RRC reconfiguration message from the base station, the RRC reconfiguration message reconfiguring a parameter of the UE related to the transmission, wherein the trigger is receiving the RRC reconfiguration message.

33. The apparatus of any of clauses 29-32, wherein the parameter is associated with a bandwidth part of the transmission.

34. The apparatus of any of clauses 29-32, wherein the parameter is associated with a LBT sub band of the transmission.

35. The apparatus of any of clauses 29-32, wherein the parameter is associated with the monitoring for the consistent LBT failure.

36. The apparatus of any of clauses 29-32, wherein the parameter is a parameter of a LBT procedure for the transmission.

37. The apparatus of any of clauses 29-31, wherein the processor is further configured to: receive a RRC reconfiguration message from the base station, the RRC reconfiguration message reconfiguring a parameter of the UE related to the transmission; and receive a LBT failure response cancellation indicator from the base station corresponding to the RRC message, wherein the trigger is receiving the LBT failure response cancellation indicator.

38. The apparatus of any of clauses 29-31 and 37, wherein the LBT failure response cancellation indicator identifies a bandwidth part of the transmission, a channel of the transmission with the consistent LBT failure, or a LBT type of the transmission.

39. The apparatus of clause 29, wherein the processor is further configured to receive a RRC reconfiguration message indicating a reconfiguration with sync, wherein the trigger is based on the RRC reconfiguration message.

40. The apparatus of any of clauses 29 and 39, wherein the trigger is receiving the RRC reconfiguration message.

41. The apparatus of any of clauses 29 and 39, wherein the trigger is completion of a sync procedure initiated by the RRC reconfiguration message with sync.

42. The apparatus of any of clauses 29 and 39-41, wherein the UE cancels all LBT recovery responses or resets all monitoring for consistent LBT failures for transmissions to a primary cell in response to detecting the trigger.

43. The apparatus of any of clauses 29 and 39-41, wherein the UE cancels all LBT recovery responses or resets all monitoring for consistent LBT failures for transmissions to a primary cell in response to detecting the trigger, and cancels all LBT recovery responses or resets all monitoring for consistent LBT failures for transmissions to a secondary cell in response to detecting the trigger.

44. The apparatus of any of clauses 29 and 39-41, wherein the UE cancels all LBT recovery responses or resets all monitoring for consistent LBT failures for transmissions to a primary cell in response to detecting the trigger, and determines whether to cancel all LBT recovery responses or resets all monitoring for consistent LBT failures for transmissions to a secondary cell in response to detecting the trigger based on whether the RRC reconfiguration message reconfigures a parameter associated with the secondary cell.

45. The apparatus of clause 29, wherein the trigger is detecting a radio link failure.

46. The apparatus of any of clauses 29 and 45, wherein the base station is a secondary node, wherein the radio link failure was with a primary secondary cell of the base station, and wherein the UE cancels all LBT recovery responses or resets all monitoring for consistent LBT failures for transmissions to secondary cells of the base station in response to detecting the radio link failure.

47. The apparatus of any of clauses 29 and 45, wherein the base station is a master node, wherein the radio link failure was with a primary cell of the base station, wherein master cell group recovery is enabled, and wherein the UE cancels all LBT recovery responses or resets all monitoring for consistent LBT failures for transmissions to secondary cells of the base station in response to detecting the radio link failure.

48. The apparatus of any of clauses 29 and 45, wherein the base station is a master node, wherein the radio link failure was with a primary cell of the base station, and wherein the UE cancels all LBT recovery responses or resets all monitoring for consistent LBT failures for transmissions to secondary cells of the base station and to secondary cells of a secondary node in response to detecting the radio link failure.

49. The apparatus of clause 29, wherein the trigger is a conditional handover of the UE to a target base station.

50. The apparatus of clause 29, wherein the trigger is based on a dual active protocol stack handover of the UE to a target base station.

51. The apparatus of any of clauses 29 and 50, wherein the trigger is completion of a random access channel procedure of the dual active protocol stack handover.

52. The apparatus of any of clauses 29 and 50, wherein the transmission is an uplink transmission, and wherein the trigger is the UE switching its uplink to the target base station.

53. The apparatus of any of clauses 29 and 50, wherein the trigger is receiving a release command from the target base station instructing the UE to release a connection with the base station.

54. The apparatus of clause 29, wherein the trigger is a failure of a dual active protocol stack handover of the UE to the base station.

55. The apparatus of any of clauses 29-54, wherein the transmission is an uplink transmission.

56. A non-transitory computer-readable medium storing computer executable code for wireless communication at a user equipment, wherein the code when executed by a processor causes the processor to perform the method of any of clauses 1-27.

57. A method of wireless communication at a base station, comprising: transmitting a RRC reconfiguration message to a user equipment (UE) reconfiguring a parameter of the UE; and transmitting a listen before talk (LBT) failure response cancellation indicator to the UE based on the parameter.

58. The method of clause 57, wherein the parameter is associated with a bandwidth part of a transmission between the UE and the base station, a channel of the transmission between the UE and the base station, or a LBT type of the transmission between the UE and the base station, and wherein the LBT failure response cancellation indicator identifies the bandwidth part of the transmission, the channel of the transmission, or the LBT type of the transmission.

59. The method of any of clauses 57-58, wherein the transmission between the UE and the base station is an uplink transmission.

60. An apparatus for wireless communication at a base station, comprising: means for transmitting a RRC reconfiguration message to a user equipment (UE) reconfiguring a parameter of the UE; and means for transmitting a listen before talk (LBT) failure response cancellation indicator to the UE based on the parameter.

61. An apparatus for wireless communication at a base station, comprising: a memory; and at least one processor coupled to the memory and configured to: transmit a RRC reconfiguration message to a user equipment (UE) reconfiguring a parameter of the UE; and transmit a listen before talk (LBT) failure response cancellation indicator to the UE based on the parameter.

62. The apparatus of clause 61, wherein the parameter is associated with a bandwidth part of a transmission between the UE and the base station, a channel of the transmission between the UE and the base station, or a LBT type of the transmission between the UE and the base station, and wherein the LBT failure response cancellation indicator identifies the bandwidth part of the transmission, the channel of the transmission, or the LBT type of the transmission.

63. The apparatus of any of clauses 61-62, wherein the transmission between the UE and the base station is an uplink transmission.

64. A non-transitory computer-readable medium storing computer executable code for wireless communication at a user equipment, wherein the code when executed by a processor causes the processor to perform the method of any of clauses 57-59.

65. An apparatus for wireless communication at a user equipment (UE), comprising: means for monitoring for a consistent listen before talk (LBT) failure for a transmission between a base station and the UE, wherein a LBT recovery response is initiated upon detecting a consistent LBT failure; means for detecting a trigger; and means for cancelling the LBT recovery response or resetting the monitoring based on the trigger.

66. The apparatus of clause 65, further comprising means for receiving a RRC reconfiguration message from the base station, the RRC reconfiguration message reconfiguring a parameter of the UE related to the transmission, wherein the trigger is receiving the RRC reconfiguration message.

67. The apparatus of clause 65, wherein the trigger is detecting a radio link failure.

68. A non-transitory computer-readable medium storing computer executable code for wireless communication at a user equipment (UE), the code when executed by a processor causes the processor to: monitor for a consistent listen before talk (LBT) failure for a transmission between a base station and the UE, wherein a LBT recovery response is initiated upon detecting a consistent LBT failure; detect a trigger; and cancel the LBT recovery response or reset the monitoring based on the trigger.

69. The non-transitory computer-readable medium of clause 68, wherein the code when executed by the processor further causes the processor to receive a RRC reconfiguration message from the base station, the RRC reconfiguration message reconfiguring a parameter of the UE related to the transmission, wherein the trigger is receiving the RRC reconfiguration message.

70. The non-transitory computer-readable medium of clause 68, wherein the trigger is detecting a radio link failure.

What is claimed is:

1. A method of wireless communication at a user equipment (UE), comprising:
    monitoring for a consistent listen before talk (LBT) failure for a transmission between a base station and the UE, wherein a LBT recovery procedure is initiated upon detecting the consistent LBT failure;
    receiving a radio resource control (RRC) reconfiguration message from the base station, the RRC reconfiguration message reconfiguring a parameter of the UE related to the transmission, wherein the parameter is associated with the monitoring for the consistent LBT failure;
    cancelling the LBT recovery procedure or resetting the monitoring based on receiving the RRC reconfiguration message;
    detecting a trigger based on detecting a radio link failure; and
    resetting all monitoring for consistent LBT failures based on the trigger.

2. The method of claim 1, wherein the transmission is to a primary cell of the base station, and wherein the LBT recovery procedure is changing the transmission from a first bandwidth part of the UE to a second bandwidth part of the UE.

3. The method of claim 1, wherein the transmission is to a secondary cell of the base station, and the LBT recovery procedure is reporting the consistent LBT failure to the base station and stopping the transmission.

4. The method of claim 1, wherein the trigger is receiving the RRC reconfiguration message.

5. The method of claim 4, wherein the RRC reconfiguration message reconfigures a second parameter of the UE related to the transmission, wherein the second parameter is associated with a bandwidth part of the transmission or is associated with an LBT sub band of the transmission.

6. The method of claim 4, wherein the RRC reconfiguration message reconfigures a second parameter of the UE related to the transmission, wherein the second parameter is a parameter of a LBT procedure for the transmission.

7. The method of claim 1, further comprising:
receiving a LBT failure response cancellation indicator from the base station corresponding to the RRC message, wherein the trigger is receiving the LBT failure response cancellation indicator.

8. The method of claim 1, wherein the trigger is detecting the radio link failure.

9. The method of claim 8, wherein the radio link failure was with a primary secondary cell of the base station, and wherein the UE cancels all LBT recovery procedures or resets all monitoring for consistent LBT failures for transmissions to secondary cells of the base station in response to detecting the radio link failure.

10. The method of claim 8, wherein the base station is a primary node, wherein the radio link failure was with a primary cell of the base station, wherein primary cell group recovery is enabled, and wherein the UE cancels all LBT recovery procedures or resets all monitoring for consistent LBT failures for transmissions to secondary cells of the base station in response to detecting the radio link failure.

11. The method of claim 8, wherein the base station is a primary node, wherein the radio link failure was with a primary cell of the base station, and wherein the UE cancels all LBT recovery procedures or resets all monitoring for consistent LBT failures for transmissions to secondary cells of the base station and to secondary cells of a secondary node in response to detecting the radio link failure.

12. The method of claim 1, wherein the trigger is based on a dual active protocol stack handover of the UE to a target base station.

13. An apparatus for wireless communication at a user equipment (UE), comprising:
a memory; and
at least one processor coupled to the memory and configured to:
monitor for a consistent listen before talk (LBT) failure for a transmission between a base station and the UE, wherein a LBT recovery procedure is initiated upon detecting the consistent LBT failure;
receiving a radio resource control (RRC) reconfiguration message from the base station, the RRC reconfiguration message reconfiguring a parameter of the UE related to the transmission, wherein the parameter is associated with the monitoring for the consistent LBT failure;
cancel the LBT recovery procedure or resetting the monitoring based on receiving the RRC reconfiguration message;
detecting a trigger based on detecting a radio link failure; and
resetting all monitoring for consistent LBT failures based on the trigger.

14. The apparatus of claim 13, wherein the transmission is to a primary cell of the base station, and wherein the LBT recovery procedure is changing the transmission from a first bandwidth part of the UE to a second bandwidth part of the UE.

15. The apparatus of claim 13, wherein the transmission is to a secondary cell of the base station, and the LBT recovery procedure is reporting the consistent LBT failure to the base station and stopping the transmission.

16. The apparatus of claim 13, wherein the at least one processor is further configured to receive the RRC reconfiguration message from the base station, wherein the trigger is receiving the RRC reconfiguration message.

17. The apparatus of claim 16, wherein the RRC reconfiguration message reconfigures a second parameter of the UE related to the transmission, wherein the second parameter is associated with a bandwidth part of the transmission or is associated with an LBT sub band of the transmission.

18. The apparatus of claim 16, wherein the RRC reconfiguration message reconfigures a second parameter of the UE related to the transmission, wherein the second parameter is a parameter of a LBT procedure for the transmission.

19. The apparatus of claim 13, wherein the processor is further configured to:
receive a LBT failure response cancellation indicator from the base station corresponding to the RRC message, wherein the trigger is receiving the LBT failure response cancellation indicator.

20. The apparatus of claim 13, wherein the trigger is detecting the radio link failure.

21. The apparatus of claim 20, wherein the radio link failure was with a primary secondary cell of the base station, and wherein the UE cancels all LBT recovery procedures or resets all monitoring for consistent LBT failures for transmissions to secondary cells of the base station in response to detecting the radio link failure.

22. The apparatus of claim 20, wherein the base station is a primary node, wherein the radio link failure was with a primary cell of the base station, wherein primary cell group recovery is enabled, and wherein the UE cancels all LBT recovery procedures or resets all monitoring for consistent LBT failures for transmissions to secondary cells of the base station in response to detecting the radio link failure.

23. The apparatus of claim 20, wherein the base station is a primary node, wherein the radio link failure was with a primary cell of the base station, and wherein the UE cancels all LBT recovery procedures or resets all monitoring for consistent LBT failures for transmissions to secondary cells of the base station and to secondary cells of a secondary node in response to detecting the radio link failure.

24. The apparatus of claim 13, wherein the trigger is based on a dual active protocol stack handover of the UE to a target base station.

25. An apparatus for wireless communication at a user equipment (UE), comprising:
means for monitoring for a consistent listen before talk (LBT) failure for a transmission between a base station and the UE, wherein a LBT recovery procedure is initiated upon detecting the consistent LBT failure;
means for receiving a radio resource control (RRC) reconfiguration message from the base station, the RRC reconfiguration message reconfiguring a parameter of the UE related to the transmission, wherein the parameter is associated with the monitoring for the consistent LBT failure;
means for cancelling the LBT recovery procedure or resetting the monitoring based on receiving the RRC reconfiguration message;
means for detecting a trigger based on detecting a radio link failure; and
means for resetting all monitoring for consistent LBT failures based on the trigger.

26. The apparatus of claim 25, wherein the transmission is to a primary cell of the base station, and wherein the LBT recovery procedure is changing the transmission from a first bandwidth part of the UE to a second bandwidth part of the UE.

27. The apparatus of claim 25, wherein the trigger is detecting the radio link failure.

28. A non-transitory computer-readable medium storing computer executable code for wireless communication at a user equipment (UE), the code when executed by a processor causes the processor to:
 monitor for a consistent listen before talk (LBT) failure for a transmission between a base station and the UE, wherein a LBT recovery procedure is initiated upon detecting the consistent LBT failure;
 receive a radio resource control (RRC) reconfiguration message from the base station, the RRC reconfiguration message reconfiguring a parameter of the UE related to the transmission, wherein the parameter is associated with the monitoring for the consistent LBT failure;
 cancel the LBT recovery procedure or reset the monitoring based on receiving the RRC reconfiguration message;
 detect a trigger based on detecting a radio link failure; and
 resetting all monitoring for consistent LBT failures based on the trigger.

29. The non-transitory computer-readable medium of claim 28, wherein the transmission is to a secondary cell of the base station, and the LBT recovery procedure is reporting the consistent LBT failure to the base station and stopping the transmission.

30. The non-transitory computer-readable medium of claim 28, wherein the trigger is detecting the radio link failure.

* * * * *